(12) United States Patent
Yamashita et al.

(10) Patent No.: US 11,168,387 B2
(45) Date of Patent: Nov. 9, 2021

(54) STEEL MATERIAL FOR CARBURIZED BEARING PART

(71) Applicants: Nippon Steel Corporation, Tokyo (JP); JTEKT Corporation, Osaka (JP)

(72) Inventors: Tomohiro Yamashita, Tokyo (JP); Takahisa Suzuki, Tokyo (JP); Yutaka Neishi, Tokyo (JP); Daisuke Hirakami, Tokyo (JP); Kohei Kanetani, Osaka (JP); Takashi Sada, Osaka (JP)

(73) Assignees: Nippon Steel Corporation, Tokyo (JP); JTEKT Corporation, Osaka (JP)

( * ) Notice: Subject to any disclaimer, the term of this patent is extended or adjusted under 35 U.S.C. 154(b) by 85 days.

(21) Appl. No.: 16/639,231

(22) PCT Filed: Aug. 24, 2018

(86) PCT No.: PCT/JP2018/031459
§ 371 (c)(1),
(2) Date: Feb. 14, 2020

(87) PCT Pub. No.: WO2019/039610
PCT Pub. Date: Feb. 28, 2019

(65) Prior Publication Data
US 2020/0208246 A1    Jul. 2, 2020

(30) Foreign Application Priority Data
Aug. 25, 2017    (JP) .............................. JP2017-161695

(51) Int. Cl.
*C22C 38/46*    (2006.01)
*C21D 1/06*    (2006.01)
(Continued)

(52) U.S. Cl.
CPC ................ *C22C 38/46* (2013.01); *C21D 1/06* (2013.01); *C21D 1/32* (2013.01); *C21D 6/002* (2013.01);
(Continued)

(58) Field of Classification Search
CPC . C21D 1/06; C21D 1/32; C21D 6/002; C21D 6/005; C21D 6/008; C21D 6/02;
(Continued)

(56) References Cited

U.S. PATENT DOCUMENTS

2012/0018063 A1    1/2012    Hashimura et al.
2017/0218489 A1    8/2017    Neishi et al.
(Continued)

FOREIGN PATENT DOCUMENTS

CN    102378822 A    3/2012
CN    106661691 A    5/2017
(Continued)

OTHER PUBLICATIONS

English Abstract of JP-H08-49057.
(Continued)

*Primary Examiner* — Jie Yang
(74) *Attorney, Agent, or Firm* — Banner & Witcoff, Ltd.

(57) ABSTRACT

The steel material for a carburized bearing part according to the present invention contains, by mass %, C: 0.25 to 0.45%, Si: 0.15 to 0.45%, Mn: 0.40 to 1.50%, P: 0.015% or less, S: 0.005% or less, Cr: 0.60 to 2.00%, Mo: 0.10 to 0.35%, V: 0.20 to 0.40%, Al: 0.005 to 0.100%, Ca: 0.0002 to 0.0010%, N: 0.0300% or less and O: 0.0015% or less, with the balance being Fe and impurities, and satisfies Formulae (1) to (3).

$$1.20 < 0.4Cr + 0.4Mo + 4.5V < 2.75 \quad (1)$$

$$A1/A2 > 0.50 \quad (2)$$

$$2.7C + 0.4Si + Mn + 0.45Ni + 0.8Cr + Mo + V > 2.55 \quad (3)$$

(Continued)

Formula (2) shows an area fraction of sulfides containing Ca in an amount of 1 mol % or more among sulfides having an equivalent circular diameter of 1 μm or more.

4 Claims, 4 Drawing Sheets

(51) Int. Cl.
| | |
|---|---|
| C21D 1/32 | (2006.01) |
| C21D 6/00 | (2006.01) |
| C21D 9/40 | (2006.01) |
| C22C 38/00 | (2006.01) |
| C22C 38/02 | (2006.01) |
| C22C 38/04 | (2006.01) |
| C22C 38/06 | (2006.01) |
| C22C 38/22 | (2006.01) |
| C22C 38/24 | (2006.01) |
| C22C 38/26 | (2006.01) |
| C22C 38/28 | (2006.01) |
| C22C 38/32 | (2006.01) |
| C22C 38/44 | (2006.01) |
| C23C 8/22 | (2006.01) |
| F16C 33/62 | (2006.01) |

(52) U.S. Cl.
CPC ............. *C21D 6/005* (2013.01); *C21D 6/008* (2013.01); *C21D 9/40* (2013.01); *C22C 38/002* (2013.01); *C22C 38/02* (2013.01); *C22C 38/04* (2013.01); *C22C 38/06* (2013.01); *C22C 38/22* (2013.01); *C22C 38/24* (2013.01); *C22C 38/26* (2013.01); *C22C 38/28* (2013.01); *C22C 38/32* (2013.01); *C22C 38/44* (2013.01); *C23C 8/22* (2013.01); *F16C 33/62* (2013.01); *F16C 2204/60* (2013.01)

(58) Field of Classification Search
CPC ......... C21D 9/40; C22C 33/04; C23C 30/005; F16C 2204/60; F16C 2204/70; F16C 2223/16; F16C 2240/90; F16C 33/32; F16C 33/34
USPC .......................................................... 420/84
See application file for complete search history.

(56) References Cited

U.S. PATENT DOCUMENTS

2019/0002999 A1\* 1/2019 Miyanishi ................. C23C 8/02
2020/0216937 A1\* 7/2020 Watari .................... C22C 38/04

FOREIGN PATENT DOCUMENTS

| JP | H08-49057 A | 2/1996 |
|---|---|---|
| JP | H11-12684 A | 1/1999 |
| JP | 2008-280583 A | 11/2008 |
| JP | 2013-147689 A | 8/2013 |

OTHER PUBLICATIONS

English Abstract of JP-2008-280583.
English Abstract of JP-H11-12684.
English Abstract of JP-2013-147689.

\* cited by examiner

STEEL MATERIAL FOR CARBURIZED BEARING PART

TECHNICAL FIELD

The present invention relates to a steel material for a carburized bearing part, and more particularly relates to a steel material for a carburized bearing part that can be applied as a medium-sized or large-sized bearing part for use in mining machinery or use in construction machinery.

BACKGROUND ART

Bearing steels and case hardening steels are used as steel material for medium-sized or large-sized bearing parts that are used for mining machinery or construction machinery. Bearing steels are typified by SUJ3 and SUJ5 defined in JIS G 4805 (2008). Case hardening steels are typified by SNCM815 defined in JIS G 4053 (2008). These steel materials are produced into bearing parts by the following method. The steel material is subjected to predetermined processes (for example, hot forging, cutting and the like) to produce an intermediate product having a desired shape. The intermediate product is subjected to a heat treatment such as quenching and tempering or carburizing-quenching and tempering to adjust the hardness and microstructure of the steel material. A bearing part having desired bearing performance (wear, surface initiated spalling life, rolling contact fatigue properties and the like) is produced by the processes described above.

In particular, in a case where improvement of wear or surface initiated spalling life is sought as the bearing performance, carburizing treatment may in some cases be performed for the aforementioned heat treatment. In the present description, the term "carburizing treatment" means a treatment in which carburizing-quenching and tempering, or carbonitriding-quenching and tempering are performed. In the carburizing treatment, the outer layer of the steel material is hardened by increasing the carbon concentration or the carbon and nitrogen concentrations in the outer layer of the steel material.

In the present description, a bearing part subjected to a carburizing treatment is also referred to as a "carburized bearing part". Techniques for further enhancing the bearing performance of carburized bearing parts are proposed in Japanese Patent Application Publication No. 8-49057 (Patent Literature 1), Japanese Patent Application Publication No. 2008-280583 (Patent Literature 2), Japanese Patent Application Publication No. 11-12684 (Patent Literature 3), and Japanese Patent Application Publication No. 2013-147689 (Patent Literature 4).

In a rolling bearing disclosed in Patent Literature 1, at least one of a bearing ring and a rolling element adopts as a starting material a steel in which V: 0.8 to 2.0 wt % is contained in a medium-low carbon, low-alloy steel containing C: 0.1 to 0.7 wt %, Cr: 0.5 to 3.0 wt %, Mn: 0.3 to 1.2 wt %, Si: 0.3 to 1.5 wt % and Mo: 3 wt % or less. Carburizing or a carbonitriding treatment is performed during heat treatment of a product formed using this starting material so that relation that the carbon concentration in the product surface is within the range of 0.8 to 1.5 wt % and the V/C concentration ratio in the surface is from 1 to 2.5 is satisfied. It is disclosed in Patent Literature 1 that in this rolling bearing, V carbides precipitate at the surface and thus the wear resistance can be improved.

A case hardening steel disclosed in Patent Literature 2 has a composition consisting of, by mass %, C: 0.1 to 0.4%, Si: 0.5% or less, Mn: 1.5% or less, P: 0.03% or less, S: 0.03% or less, Cr: 0.3 to 2.5%, Mo: 0.1 to 2.0%, V: 0.1 to 2.0%, Al: 0.050% or less, O: 0.0015% or less, N: 0.025% or less, and V+Mo: 0.4 to 3.0%, with the balance being Fe and unavoidable impurities. In the case hardening steel, the C concentration in the outer layer after tempering is 0.6 to 1.2%, the surface hardness is HRC 58 or more and less than 64, and among V carbides that disperse and precipitate in the outer layer, the numerical proportion of fine V carbides having a particle size of less than 100 nm is 80% or more. It is disclosed in Patent Literature 2 that in this case hardening steel, by causing V carbides to finely disperse and act as trap sites for hydrogen, hydrogen embrittlement resistance can be increased and surface fatigue life can be enhanced.

In a case hardening steel for cold forging disclosed in Patent Literature 3, the area fraction of ferrite+pearlite is 75% or more, the average particle size of ferrite is 40 µm or less, and the average particle size of pearlite is 30 µm or less. It is disclosed in Patent Literature 3 that by having the aforementioned microstructure, the case hardening steel for cold forging can increase wear resistance.

A carburized bearing steel disclosed in Patent Literature 4 has a chemical composition consisting of, by mass %, C: 0.05 to 0.30%, Si: 0.05 to 1.0%, Mn: 0.10 to 2.0%, P: 0.05% or less, S: 0.008% or less, Al: 0.010 to 0.050%, Cr: 0.4 to 2.0%, N: 0.010 to 0.025% and O: 0.0015% or less, with the balance being Fe and impurities. With respect to this carburized bearing steel, measurement of $\sqrt{AREA}_{max}$ that is the maximum oxide diameter and $\sqrt{AREA}_{max}$ that is the maximum sulfide diameter in a 100 mm² vertical section in the longitudinal direction of the steel material is performed at 30 locations, respectively, and a predicted $\sqrt{AREA}_{max}$ that is the predicted maximum diameter of oxides and a predicted $\sqrt{AREA}_{max}$ that is the predicted maximum diameter of sulfides within a region of 30,000 mm² that are calculated using extreme value statistical processing are 50 µm or less and 60 µm or less, respectively. Furthermore, the average aspect ratio of the largest oxides and of the largest sulfides at the 30 locations is 5.0 or less, respectively. In addition, the contents by mass % in the average composition of the largest oxides at the 30 locations are CaO: 2.0 to 20%, MgO: 0 to 20% and $SiO_2$: 0 to 10%, with the balance being $Al_2O_3$, consisting of any one of binary oxides containing CaO and $Al_2O_3$, ternary oxides containing CaO, MgO and $Al_2O_3$, ternary oxides containing CaO, $SiO_2$ and $Al_2O_3$, and quaternary oxides containing CaO, MgO, $SiO_2$ and $Al_2O_3$. Further, the contents by mass % in the average composition of the largest sulfides at the 30 locations are unary sulfides containing CaS in which CaS: 100%, or binary sulfides containing CaS and MnS in which CaS: 1.0% or more, MgS: 0 to 20%, and the balance is MnS, or ternary sulfides containing CaS, MgS and MnS. It is disclosed in Patent Literature 4 that, by inhibiting the size of oxides that are inclusions and sulfides that are inclusions and suppressing the aspect ratio of the largest oxides and largest sulfides, rolling contact fatigue properties can be enhanced.

CITATION LIST

Patent Literature

Patent Literature 1: Japanese Patent Application Publication No. 8-49057

Patent Literature 2: Japanese Patent Application Publication No. 2008-280583

Patent Literature 3: Japanese Patent Application Publication No. 11-12684

Patent Literature 4: Japanese Patent Application Publication No. 2013-147689

SUMMARY OF INVENTION

Technical Problem

In this connection, in recent years, there is a growing demand to extend the lives of bearing parts under impact environments, poor lubrication environments, and high interfacial pressure conditions, and further improvements in toughness, wear resistance and surface initiated spalling life are being sought. Medium-sized and large-sized bearing parts that are applied for use in mining machinery and construction machinery, in particular, are used in environments that include earth and sand or rocks. Therefore, when bearing parts are being used, some earth and sand or rocks or the like may enter the inside of the bearings as foreign matter. Improvements in toughness, wear resistance and surface initiated spalling life are also sought for such states in which foreign matter has entered a bearing.

To increase toughness and surface initiated spalling life, carburizing treatment or carbonitriding treatment has been performed on case hardening steel that is typified by the aforementioned SNCM to increase retained austenite. However, retained austenite is soft, and thus if retained austenite is increased, wear resistance may decrease.

Further, in the bearing part disclosed in Patent Literature 1, the content of V is large. Therefore, in some cases, coarse V carbides or V carbo-nitrides are formed, and the toughness is low. With regard to the case hardening steel disclosed in Patent Literature 2, the toughness may be low depending on the content of S and the content of P. With respect to the technique proposed in Patent Literature 3, in some cases, a problem arises regarding the toughness or hardenability. With respect to the technique proposed in Patent Literature 4, no consideration has been given to fatigue characteristics in a case where foreign matter becomes mixed in during use.

An objective of the present disclosure is to provide a steel material for a carburized bearing part that is excellent in hardenability, is excellent in toughness and wear resistance for a carburized bearing part after a carburizing treatment, and is excellent in surface initiated spalling life even in a case where foreign matter enters the inside of the carburized bearing during use.

Solution to Problem

A steel material for a carburized bearing part according to the present disclosure has a chemical composition consisting of, by mass %,
C: 0.25 to 0.45%,
Si: 0.15 to 0.45%,
Mn: 0.40 to 1.50%,
P: 0.015% or less,
S: 0.005% or less,
Cr: 0.60 to 2.00%,
Mo: 0.10 to 0.35%,
V: 0.20 to 0.40%,
Al: 0.005 to 0.100%,
Ca: 0.0002 to 0.0010%,
N: 0.0300% or less,
O: 0.0015% or less,
Ni: 0 to 1.00%,
B: 0 to 0.0050%,
Nb: 0 to 0.100%, and
Ti: 0 to 0.10%, with the balance being Fe and impurities, and satisfying Formula (1) to Formula (3):

$$1.20 < 0.4Cr + 0.4Mo + 4.5V < 2.75 \quad (1)$$

$$A1/A2 > 0.50 \quad (2)$$

$$2.7C + 0.4Si + Mn + 0.45Ni + 0.8Cr + Mo + V > 2.55 \quad (3)$$

where, a content (mass %) of a corresponding element is substituted for each symbol of an element in Formula (1) and Formula (3); if a corresponding element is not contained, "0" is substituted for the symbol of the relevant element; in Formula (2), "A1" represents a gross area ($\mu m^2$) of sulfides containing Ca in an amount of 1 mol % or more and having an equivalent circular diameter of 1 $\mu m$ or more in an observation region with a gross area of 4 $mm^2$ or more in a cross section that is parallel to a rolling direction; and "A2" represents a gross area ($\mu m^2$) of sulfides having an equivalent circular diameter of 1 $\mu m$ or more in the observation region.

Advantageous Effects of Invention

The steel material for a carburized bearing part of the present disclosure is excellent in hardenability, is excellent in toughness and wear resistance for a carburized bearing part after a carburizing treatment, and is excellent in surface initiated spalling life even in a case where foreign matter enters inside of the carburized bearing during use.

DESCRIPTION OF EMBODIMENTS

Figure 1:
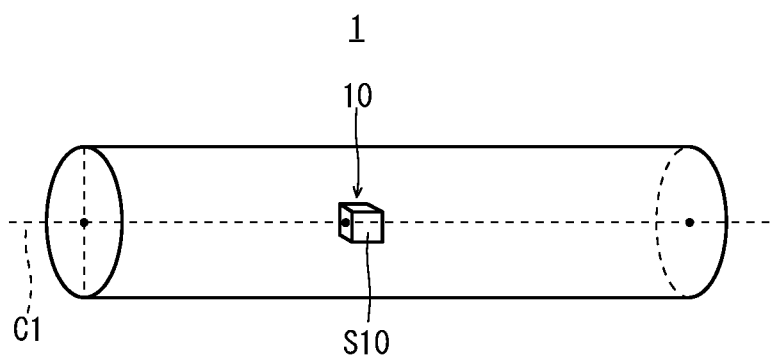
FIG. 1 is a schematic diagram for describing a position for taking a sample from a steel material for a carburized bearing part.

The present inventors conducted investigations and studies regarding the hardenability of a steel material for a carburized bearing part, and the toughness, wear resistance and surface initiated spalling life of a carburized bearing part after carburizing treatment. As a result, the present inventors obtained the following findings.

(A) In order to improve the wear resistance of a carburized bearing part that is produced by performing carburizing treatment on a steel material for a carburized bearing part, it is effective to disperse fine precipitates such as carbides and/or carbo-nitrides in the outer layer of the carburized bearing part. In the present description, carbides and carbo-nitrides are also referred to by the generic term "carbides and the like". The wear resistance of a carburized bearing part is influenced by the surface hardness and retained austenite amount of the carburized bearing part. Accordingly, to improve the wear resistance of a carburized bearing part, it is effective to cause fine V-containing carbides and the like (carbides and the like containing V) to disperse in the outer layer of the carburized bearing part, and to adjust the content of V, the content of Cr and the content of Mo which are factors that influence the surface hardness and retained austenite amount.

V forms carbides and/or carbo-nitrides (that is, carbides and the like). Hereunder, carbides and the like containing V are also referred to as "V carbides and the like". If the content of V is increased, the wear resistance of a carburized bearing part after carburizing treatment may be increased by formation of V carbides and the like. However, if the content of V is too high, hot workability decreases and cracks occur during hot working (during hot rolling or during hot forging). In addition, if undissolved coarse V carbides and the like remain in the steel material, the toughness of a core portion of the carburized bearing part may decrease. Further, coarse V carbides and the like act as sources of stress concentration. Therefore, in an environment in which a carburized bearing part is used, coarse V carbides and the like are liable to act as initiation points of fatigue, and the surface initiated spalling life of the carburized bearing part is liable to decrease.

Therefore, the present inventors conducted studies regarding methods for inhibiting the formation of coarse V carbides and the like. As a result, the present inventors have discovered that the formation of coarse V carbides and the like can be inhibited by adjusting the balance between the content of V, the content of Cr and the content of Mo while keeping the content of V low.

It is effective to increase precipitation nuclei generation sites in order to cause precipitates of V carbides and the like to finely disperse. If Cr, Mo and V are contained in combination, precipitation nuclei generation sites may increase. As a result, a large number of V carbides and the like may be formed. However, if these V carbides and the like do not dissolve sufficiently in a heating process of a hot rolling process and remain in the steel, in some cases, coarse V carbides and the like may be present in the carburized bearing part. In such case, the coarse V carbides and the like may act as initiation points of fatigue, and the surface initiated spalling life of the carburized bearing part may decrease. Therefore, it is preferable that the V carbides and the like adequately dissolve during at least the hot rolling process. However, if the content of V, the content of Cr and the content of Mo are too high, undissolved V carbides and the like may remain in the hot rolling process. Consequently, coarse V carbides and the like may remain in the steel material for a carburized bearing part. Therefore, it is necessary to adjust the content of V, the content of Cr and the content of Mo to take into account the toughness, wear resistance and surface initiated spalling life of the carburized bearing part after carburizing treatment.

Taking into consideration the above findings, the present inventors have discovered that if the chemical composition of the steel material for a carburized bearing part satisfies the following Formula (1), appropriate formation of V carbides and the like can be realized, and the toughness, wear resistance and surface initiated spalling life of the carburized bearing part are improved.

$$1.20 < 0.4Cr + 0.4Mo + 4.5V < 2.75 \tag{1}$$

where, the content (mass %) of the corresponding element is substituted for each symbol of an element in Formula (1).

Here, it is defined that Fn1=0.4Cr+0.4Mo+4.5V. Fn1 is an index of precipitation nuclei generation sites. If Fn1 is 1.20 or less, the number of precipitation nuclei generation sites may be insufficient, and there may be insufficient formation of fine V carbides and the like after the carburizing treatment. In such case, the wear resistance of the carburized bearing part cannot be sufficiently increased. On the other hand, if Fn1 is 2.75 or more, undissolved V carbides may remain in the steel material for a carburized bearing part. In such case, the toughness of the carburized bearing part may decrease. Furthermore, in such case, coarse V carbides and the like may be formed in the carburized bearing part. As a result, the surface initiated spalling life of the carburized bearing part may decrease. If Fn1 is higher than 1.20 and less than 2.75, provided that conditions described later are satisfied, excellent toughness, excellent wear resistance and excellent surface initiated spalling life can be obtained.

(B) High strength is also demanded for the core portion of a carburized bearing part. Therefore, a steel material for a carburized bearing part is also required to have sufficient hardenability. When the chemical composition of a steel material for a carburized bearing part satisfies the following Formula (3), sufficient hardenability can be secured and high strength is obtained even when the carburized bearing part is a medium-sized part or a large-sized part that can be applied for use in mining machinery or use in construction machinery. In this case, a medium-sized bearing part is, for example, a bearing part having an external diameter within the range of 100 to 300 mm, and a large-sized bearing part is, for example, a bearing part having an external diameter within the range of 300 mm or more.

$$2.7C + 0.4Si + Mn + 0.45Ni + 0.8Cr + Mo + V > 2.55 \tag{3}$$

where, the content (mass %) of the corresponding element is substituted for each symbol of an element in Formula (3). If the corresponding element is not contained, "0" is substituted for the symbol of the relevant element.

(C) In a case where a carburized bearing part is medium sized or large sized, as well as excellent hardenability for obtaining a high strength, excellent toughness is also sought for the carburized bearing part. The structure of a carburized bearing part is mainly composed of a tempered martensitic structure. The toughness of this kind of structure is mainly influenced by the content of C that influences the strength of the tempered martensitic structure and the substructure, the content of P that leads to grain boundary embrittlement, and the amount of sulfides that are contained in the steel material.

Therefore, in the steel material for a carburized bearing part of the present embodiment, in order to obtain strength required as a large-sized bearing part, the content of C is made 0.25% or more. In addition, to ensure toughness, preferably the content of P is made 0.015% or less, and the content of S is made 0.010% or less. However, sulfides also significantly influence the surface initiated spalling life of a carburized bearing part. Therefore, taking into consideration the surface initiated spalling life also, the content of S is limited to 0.005% or less.

(D) As described above, a bearing part for use in mining machinery or use in construction machinery is a large size. In addition, mining machinery and construction machinery are used in severe environments in which earth and sand or rocks or the like come in contact with or collide against the mining machinery and construction machinery. Therefore, as the result of the impact of earth and sand or rocks or the like against the mining machinery or construction machinery, an external force of an impact or the like is also applied to the bearing part for use in mining machinery or use in construction machinery. In addition, in the case of a bearing for use in mining machinery or use in construction machinery, some earth and sand or a part of a rock is liable to enter the inside of the bearing as foreign matter. Accordingly, not only is a carburized bearing part for use in mining machinery or construction machinery required to have high strength and high toughness, but it is also required to have excellent surface initiated spalling life even in a state in which foreign matter has got mixed into the inside the carburized bearing part.

Although there have been some studies in the past on surface initiated spalling life for which the mixing in of foreign matter is not assumed, no studies have been conducted regarding surface initiated spalling life in a state in which foreign matter has become mixed into the inside of a bearing. Therefore, the present inventors conducted studies regarding the surface initiated spalling life in a severe usage environment such as when foreign matter has become mixed into the inside of a bearing.

Heretofore, because the mixing in of foreign matter has not been taken into account, it has been considered that coarse sulfides and coarse oxides that are coarse inclusions influence the surface initiated spalling life. Therefore, for example, in Patent Literature 4 also, attention is focused on oxides and sulfides which have a predicted maximum diameter in extreme value statistics.

However, as the result of studies by the present inventors, it has been found that under usage conditions in which foreign matter has been mixed in, because stress concentrates locally in the bearing part, the surface initiated spalling life does not sufficiently improve if attention is focused simply on coarse inclusions having an equivalent circular diameter of 50 μm or more. As the result of further studies, it has been found that, with respect to surface initiated spalling life under a condition of contamination with foreign matter, not only coarse inclusions but also all sulfides (regardless of whether coarse or fine) that disperse in the steel act as starting points for cracks. Further, as the result of additional studies by the present inventors, it has been found that, with respect to the surface initiated spalling life under a condition of contamination with foreign matter, it is effective to increase the proportion of spheroidized sulfides among all sulfides including fine sulfides having an equivalent circular diameter of less than 50 μm and not just among coarse sulfides having an equivalent circular diameter of 50 μm or more.

Based on the above findings, the present inventors performed studies regarding spheroidization of sulfides of all sizes including fine sulfides (sulfides with an equivalent circular diameter of less than 50 μm) and coarse sulfides (sulfides with an equivalent circular diameter of 50 μm or more) in steel material. Normally, sulfides are liable to deform at a high temperature. Therefore, sulfides easily deform and elongate during hot rolling. In a usage environment under a condition in which a bearing part is contaminated with foreign matter, irrespective of size, elongated sulfides act as initiation points of fatigue and cause the surface initiated spalling life to decrease. Accordingly, to increase the surface initiated spalling life, it is effective to increase the deformation resistance of sulfides at a high temperature. In this case, it is difficult for sulfides to be elongated during hot rolling, and the sulfides easily maintain a spheroid shape, and consequently it is difficult for the sulfides to act as initiation points of fatigue in a usage environment under a condition of contamination with foreign matter. If Ca is dissolved in a sulfide, the deformation resistance of the sulfide at a high temperature increases. Therefore, sulfides in which Ca dissolved are liable to maintain a spheroid shape even after hot rolling, and the aspect ratio (major axis/minor axis of the sulfides) is small.

In the case of coarse sulfides, most of the sulfides are complex sulfides in which multiple fine sulfides agglomerate. Therefore, if sulfides containing Ca and sulfides which do not contain Ca agglomerate to form complex sulfides, spheroidization is liable to proceed because Ca is contained therein. That is, with respect to coarse sulfides which are formed when multiple sulfides agglomerate, spheroidization that is caused as a result of the sulfides containing Ca is liable to proceed comparatively easily.

On the other hand, the majority of fine sulfides that are small in size are sulfides that exist individually without agglomerating (sulfides that are not complex sulfides). That is, the fine sulfides in conventional steel materials for a carburized bearing part include non-Ca-containing fine sulfides (fine sulfides that do not contain Ca) of singular MnS type and Ca-containing fine sulfides (fine sulfides containing Ca) of singular CaS type which are each independently present in large number. In this case, although the Ca-containing fine sulfides that are composed of CaS maintain a comparatively spheroid shape even after hot working (hot rolling and hot forging), the non-Ca-containing fine sulfides composed of MnS are elongated by hot working and consequently the aspect ratio thereof increases. As a result, in the carburized bearing part, the surface initiated spalling life in a usage environment under a condition of contamination with foreign matter is lowered.

Therefore, the present inventors have reached the idea that if Ca can also be contained in fine sulfides that are liable to exist as singular sulfides, and not just coarse sulfides, the ratio of sulfides that maintain a spheroidal state even after hot working among the sulfides of all sizes in the steel material can be increased. Further, the present inventors have reached the idea that, in this case, the surface initiated spalling life can be improved even if the carburized bearing part is used in an environment under a condition of contamination with foreign matter. Therefore, the present inventors conducted studies regarding increasing the spheroidization rate for fine and coarse sulfides in steel material.

As the result of such studies, it has been found that, with respect to fine sulfides and coarse sulfides in a steel material, the aspect ratio after hot rolling of sulfides in which the content of Ca is 1 mol % or more is smaller than the aspect ratio after hot rolling of sulfides in which the content of Ca is less than 1 mol %. As the result of further studies, the present inventors have discovered that when sulfides in a steel material for a carburized bearing part satisfy the following Formula (2), the deformation resistance during hot working of the sulfides increases, and as a result, the surface initiated spalling life of the carburized bearing part under a condition of contamination with foreign matter increases.

$$A1/A2 > 0.50 \quad (2)$$

where, A1 represents the gross area (μm$^2$) of sulfides containing Ca in an amount of 1 mol % or more and having an equivalent circular diameter of 1 μm or more in an observation region with a gross area of 4 mm$^2$ or more in a cross section parallel to a rolling direction. A2 represents the gross area (μm$^2$) of sulfides having an equivalent circular diameter of 1 μm or more in the aforementioned observation region.

It is defined that Fn2=A1/A2. Fn2 is an index that shows the proportion of sulfides in a spheroidal state among sulfides in the steel material for a carburized bearing part after hot rolling. When Fn2 is 0.50 or less, sulfides elongate during hot rolling, and in the steel material after hot rolling, the ratio of sulfides in a spheroidal state with respect to the entire sulfides overall is small. In this case, when the carburized bearing part after carburizing treatment is used in an environment in which foreign matter is mixed in (under a condition of contamination with foreign matter), elongated sulfides act as initiation points of fatigue, and the surface initiated spalling life is liable to decrease. On the other hand, when Fn2 is greater than 0.50, in the steel material after hot rolling, the ratio of sulfides in a spheroidal state with respect to the entire sulfides overall is sufficiently large. Therefore, when the carburized bearing part after carburizing treatment is used in an environment in which foreign matter is mixed in (under a condition of contamination with foreign matter), it is difficult for sulfides to act as initiation points of fatigue, and the surface initiated spalling life improves.

A steel material for a carburized bearing part according to the present embodiment, which has been completed based on the above findings, has the composition of any of the following [1] to [3].

[1]
A steel material for a carburized bearing part having a chemical composition consisting of, by mass %,
C: 0.25 to 0.45%,
Si: 0.15 to 0.45%,
Mn: 0.40 to 1.50%,
P: 0.015% or less,
S: 0.005% or less,
Cr: 0.60 to 2.00%,
Mo: 0.10 to 0.35%,
V: 0.20 to 0.40%,
Al: 0.005 to 0.100%,
Ca: 0.0002 to 0.0010%,
N: 0.0300% or less,
O: 0.0015% or less,
Ni: 0 to 1.00%,
B: 0 to 0.0050%,
Nb: 0 to 0.100%, and
Ti: 0 to 0.10%
with the balance being Fe and impurities, and satisfying Formula (1) to Formula (3):

$$1.20<0.4Cr+0.4Mo+4.5V<2.75 \quad (1)$$

$$A1/A2>0.50 \quad (2)$$

$$2.7C+0.4Si+Mn+0.45Ni+0.8Cr+Mo+V>2.55 \quad (3)$$

where, a content (mass %) of a corresponding element is substituted for each symbol of an element in Formula (1) and Formula (3). If a corresponding element is not contained, "0" is substituted for the symbol of the relevant element. In Formula (2), "A1" represents a gross area (μm$^2$) of sulfides containing Ca in an amount of 1 mol % or more and having an equivalent circular diameter of 1 μm or more in an observation region with a gross area of 4 mm$^2$ or more in a cross section that is parallel to a rolling direction. "A2" represents a gross area (μm$^2$) of sulfides having an equivalent circular diameter of 1 μm or more in the observation region.

[2]
The steel material for a carburized bearing part according to [1] above, wherein the chemical composition contains one or more types of element selected from a group consisting of:
Ni: 0.05 to 1.0%, and
B: 0.0003 to 0.0050%.

[3]
The steel material for a carburized bearing part according to [1] or [2] above, wherein the chemical composition contains one or more types of element selected from a group consisting of:
Nb: 0.005 to 0.100%, and
Ti: 0.010 to 0.100%.

Hereunder, the steel material for a carburized bearing part according to the present embodiment is described in detail. The symbol "%" in relation to an element means mass percent unless specifically stated otherwise.

[Regarding Carburized Bearing Part]

The steel material for a carburized bearing part of the present embodiment is used for a carburized bearing part. The term "carburized bearing part" means a bearing part subjected to carburizing treatment. In the present description, the term "carburizing treatment" means a treatment in which carburizing-quenching and tempering, or carbonitriding-quenching and tempering are performed.

The term "bearing part" means a part for a bearing. Examples of a bearing part include a bearing ring and a rolling element. The bearing ring may be an inner ring or may be an outer ring, or may be a bearing washer. The bearing ring is not particularly limited as long as the bearing ring is a member that has a raceway surface. The rolling element may be a ball or may be a roller. Examples of a roller include a cylindrical roller, a needle roller, a conical roller and a spherical roller.

The steel material for a carburized bearing part of the present embodiment is applied to these bearing parts. The steel material for a carburized bearing part of the present embodiment is, for example, a steel bar or a wire rod.

[Chemical Composition]

The chemical composition of the steel material for a carburized bearing part of the present embodiment contains the following elements.

C: 0.25 to 0.45%

Carbon (C) increases the hardenability of the steel and increases the strength and toughness of a core portion of the steel material after quenching. C also increases the wear resistance and surface initiated spalling life of the carburized bearing part after carburizing treatment. If the content of C is less than 0.25%, these effects may not be obtained. On the other hand, if the content of C is more than 0.45%, the toughness of the steel may decrease. Therefore, the content of C is within the range of 0.25 to 0.45%. A preferable lower limit of the content of C is 0.26%, more preferably is 0.28%, and further preferably is 0.33%. A preferable upper limit of the content of C is 0.44%, more preferably is 0.43%, and further preferably is 0.42%.

Si: 0.15 to 0.45%

Silicon (Si) deoxidizes the steel. Si also increases the strength of the steel, and enhances the wear resistance of the carburized bearing part after carburizing treatment. Si also increases the temper softening resistance of the steel, and inhibits softening of the carburized bearing part when the carburized bearing part is used at a high temperature. If the content of Si is less than 0.15%, these effects may not be obtained. On the other hand, if the content of Si is more than 0.45%, the steel may be too hard, and the service life during cutting may decrease. In addition, if the steel becomes too hard, the toughness and hot workability may also decrease. Therefore, the content of Si is within the range of 0.15 to 0.45%. A preferable lower limit of the content of Si is 0.18%, more preferably is 0.20%, and further preferably is 0.25%. A preferable upper limit of the content of Si is 0.43%, more preferably is 0.40%, and further preferably is 0.35%.

Mn: 0.40 to 1.50%

Manganese (Mn) increases the hardenability of the steel, and increases the surface initiated spalling life of the carburized bearing part. If the content of Mn is less than 0.40%, this effect may not be obtained. On the other hand, if the content of Mn is more than 1.50%, the steel may become too hard, and the service life during cutting may decrease. In addition, if the steel becomes too hard, the toughness of the steel may also decrease. Therefore, the content of Mn is within the range of 0.40 to 1.50%. A preferable lower limit of the content of Mn is 0.45%, more preferably is 0.50%, and further preferably is 0.58%. A preferable upper limit of the content of Mn is 1.30%, more preferably is 1.20%, further preferably is 1.10%, more preferably is 1.10%, and further preferably is 0.75%.

P: 0.015% or Less

Phosphorus (P) is an impurity that is unavoidably contained. That is, the content of P is more than 0%. P segregates at grain boundaries, thereby causing the toughness and surface initiated spalling life of a carburized bearing part to decrease. Therefore, the content of P is 0.015% or less. A preferable upper limit of the content of P is 0.013%, more preferably is 0.012%, and further preferably is 0.011%. The content of P is preferably as low as possible. However, if the content of P is reduced extremely, production costs may increase. Therefore, when taking into consideration normal industrial production, a preferable lower limit of the content of P is 0.0001%, more preferably is 0.0005%, and further preferably is 0.001%.

S: 0.005% or Less

Sulfur (S) is an impurity that is unavoidably contained. That is, the content of S is more than 0%. S forms sulfides. The sulfides decrease the toughness of a carburized bearing part. Sulfides also reduce the surface initiated spalling life of the carburized bearing part. Therefore, the content of S is 0.005% or less. A preferable upper limit of the content of S is 0.004%, and more preferably is 0.003%. The content of S is preferably as low as possible. However, if the content of S is reduced extremely, production costs may increase. Therefore, when taking into consideration normal industrial production, a preferable lower limit of the content of S is 0.0001%, more preferably is 0.0005%, and further preferably is 0.001%.

Cr: 0.60 to 2.00%

Chromium (Cr) improves the hardenability of the steel. Together with V and Mo, Cr also promotes formation of fine V carbides and the like during carburizing treatment, thereby improving the wear resistance of the carburized bearing part. If the content of Cr is less than 0.60%, these effects may not be obtained. On the other hand, if the content of Cr is more than 2.00%, coarse V carbides and the like may be formed in the steel. In this case, the toughness and surface initiated spalling life of the carburized bearing part may decrease. Furthermore, if the content of Cr is more than 2.00%, coarse carbides and the like may remain during hot working also, and may lower the hot workability and machinability of the steel. Therefore, the content of Cr is within the range of 0.60 to 2.00%. A preferable lower limit of the content of Cr is 0.70%, more preferably is 0.80%, and further preferably is 0.85%. A preferable upper limit of the content of Cr is 1.90%, more preferably is 1.80% and further preferably is 1.70%.

Mo: 0.10 to 0.35%

Molybdenum (Mo) increases the hardenability of the steel. Mo also forms fine precipitates together with V and Cr during carburizing treatment, thereby improving wear resistance of the carburized bearing part. If the content of Mo is less than 0.10%, these effects may not be obtained. On the other hand, if the content of Mo is more than 0.35%, the hot workability and machinability of the steel may decrease. In addition, if the content of Mo is more than 0.35%, the surface initiated spalling life of the carburized bearing part may be reduced. Further, the production cost may also increase. Therefore, the content of Mo is within the range of 0.10 to 0.35%. A preferable lower limit of the content of Mo is 0.12%, more preferably is 0.15%, and further preferably is 0.20%. A preferable upper limit of the content of Mo is 0.33%, more preferably is 0.30%, and further preferably is 0.28%.

V: 0.20 to 0.40%

Vanadium (V) increases the hardenability of the steel. V also combines with Cr and Mo during carburizing treatment and forms V carbides and the like which are fine precipitates, thereby enhancing the wear resistance of the carburized bearing part. If the content of V is less than 0.20%, these effects may not be obtained. On the other hand, if the content of V is more than 0.40%, undissolved coarse V carbides and the like may remain in the steel. As a result, the toughness of the carburized bearing part and the surface initiated spalling life of the carburized bearing part may decrease. Furthermore, in a case where coarse carbides and the like remain in the steel, the hot workability and machinability of the steel decrease. Therefore, the content of V is within the range of 0.20 to 0.40%. A preferable lower limit of the content of V is 0.22%, more preferably is 0.24%, and further preferably is 0.25%. A preferable upper limit of the content of V is 0.38%, more preferably is 0.37%, and further preferably is 0.35%.

Al: 0.005 to 0.100%

Aluminum (Al) deoxidizes the steel. If the content of Al is less than 0.005%, this effect may not be obtained. On the other hand, if the content of Al is more than 0.100%, coarse oxides may be formed and the surface initiated spalling life of the carburized bearing part may decrease. Therefore, the content of Al is within the range of 0.005 to 0.100%. A preferable lower limit of the content of Al is 0.010%, more preferably is 0.015%, and further preferably is 0.020%. A preferable upper limit of the content of Al is 0.060%, more preferably is 0.050%, and further preferably is 0.045%.

Ca: 0.0002 to 0.0010%

Calcium (Ca) dissolves in sulfides, thereby spheroidizing the sulfides. Ca also enhances the deformation resistance of sulfides at high temperatures, and suppresses elongation of sulfides during hot rolling so that the sulfides maintain a spheroid shape. As a result, the surface initiated spalling life of the carburized bearing part increases. If the content of Ca is less than 0.0002%, this effect may not be obtained. On the other hand, if the content of Ca is more than 0.0010%, coarse oxides may be formed and the surface initiated spalling life of the carburized bearing part may decrease. Therefore, the content of Ca is within the range of 0.0002 to 0.0010%. A preferable lower limit of the content of Ca is 0.0003%, more preferably is 0.0004%, and further preferably is 0.0005%. A preferable upper limit of the content of Ca is 0.0009%, more preferably is 0.0008%, and further preferably is 0.0007%.

N: 0.0300% or Less

Nitrogen (N) is an impurity that is unavoidably contained. That is, the content of N is more than 0%. N dissolves in the steel and thereby reduces the hot workability of the steel. Therefore, the content of N is 0.0300% or less. A preferable upper limit of the content of N is 0.0200%, more preferably is 0.0150%, and further preferably is 0.0100%. The content of N is preferably as low as possible. However, if the content of N is reduced extremely, production costs may increase. Therefore, when taking into consideration normal industrial production, a preferable lower limit of the content of N is 0.0001%, and more preferably is 0.0010%.

O: 0.0015% or Less

Oxygen (O) is an impurity that is unavoidably contained. That is, the content of O is more than 0%. O forms oxides, thus lowering the strength of the steel. Oxides also reduce the surface initiated spalling life of the carburized bearing part. Therefore, the content of O is 0.0015% or less. A preferable upper limit of the content of O is 0.0013%, and more preferably is 0.0011%. The content of O is preferably as low as possible. However, if the content of O is reduced extremely, production costs may increase. Therefore, when taking into consideration normal industrial production, a preferable lower limit of the content of O is 0.0001%, and more preferably is 0.0010%.

The balance of the chemical composition of the steel material for a carburized bearing part according to the present invention is Fe and impurities. Here, the term "impurities" refers to elements which, during industrial production of the steel material for a carburized bearing part, are mixed in from ore or scrap that is used as a raw material, or from the production environment or the like, and which are allowed within a range that does not adversely affect the steel material for a carburized bearing part of the present disclosure.

[Regarding Optional Elements]

The aforementioned steel material for a carburized bearing part may further contain one or more types of element selected from the group consisting of Ni and B in lieu of a part of Fe. Each of these elements is an optional element, and each element increases the hardenability of the steel.

Ni: 0 to 1.00%

Nickel (Ni) is an optional element, and need not be contained. That is, the content of Ni may be 0%. If contained, Ni increases the hardenability of the steel. Ni also increases the toughness of the steel after quenching. If even a small amount of Ni is contained, these effects are obtained to a certain extent. However, if the content of Ni is more than 1.00%, the effects may be saturated, and the steel material cost may also increase. Therefore, the content of Ni is within the range of 0 to 1.00%. A preferable lower limit of the content of Ni for effectively obtaining the aforementioned effects is 0.05%, more preferably is 0.10%, and further preferably is 0.20%. A preferable upper limit of the content of Ni is 0.95%, more preferably is 0.90%, and further preferably is 0.80%.

B: 0 to 0.0050%

Boron (B) is an optional element, and need not be contained. That is, the content of B may be 0%. If contained, B increases the hardenability. B also suppresses segregation of P and S at austenite grains boundaries during quenching. If even a small amount of B is contained, these effects are obtained to a certain extent. However, if the content of B is more than 0.0050%, BN is formed and the toughness of the steel decreases. Therefore, the content of B is within the range of 0 to 0.0050%. A preferable lower limit of the content of B for effectively obtaining the aforementioned effects is 0.0002%, more preferably is 0.0003%, further preferably is 0.0005%, and more preferably is 0.0010%. A preferable upper limit of the content of B is 0.0030%, more preferably is 0.0025%, and further preferably is 0.0020%.

The aforementioned steel material for a carburized bearing part may further contain one or more types of element selected from the group consisting of Nb and Ti in lieu of a part of Fe. Each of these elements is an optional element, and each element refines the grains.

Nb: 0 to 0.100%

Niobium (Nb) is an optional element, and need not be contained. That is, the content of Nb may be 0%. If contained, Nb forms fine carbides and the like, and thereby refines the grains. By this means, the strength of the steel increases. If even a small amount of Nb is contained, this effect is obtained to a certain extent. However, if the content of Nb is more than 0.100%, the toughness of the steel decreases. Therefore, the content of Nb is within the range of 0 to 0.100%. A preferable lower limit of the content of Nb for effectively obtaining the aforementioned effect is 0.005%, more preferably is 0.010%, and further preferably is 0.030%. A preferable upper limit of the content of Nb is 0.090%, more preferably is 0.080%, and further preferably is 0.070%.

Ti: 0 to 0.10%

Titanium (Ti) is an optional element, and need not be contained. That is, the content of Ti may be 0%. If contained, Ti forms fine carbides and the like, and thereby refines the grains. By this means, the strength of the steel increases. If even a small amount of Ti is contained, this effect is obtained to a certain extent. However, if the content of Ti is more than 0.10%, the toughness of the steel decreases. Therefore, the content of Ti is within the range of 0 to 0.10%. A preferable lower limit of the content of Ti for effectively obtaining the aforementioned effect is 0.01%, more preferably is 0.015%, and further preferably is 0.02%. A preferable upper limit of the content of Ti is 0.09%, more preferably is 0.08%, and further preferably is 0.075%.

[Regarding Formula (1)]

Based on the premise that the respective elements satisfy the respective ranges described above, the chemical composition of the steel material for a carburized bearing part of the present embodiment also satisfies Formula (1):

$$1.20 < 0.4Cr + 0.4Mo + 4.5V < 2.75 \tag{1}$$

where, a content (mass %) of a corresponding element is substituted for each symbol of an element in Formula (1).

It is defined that $Fn1 = 0.4Cr + 0.4Mo + 4.5V$. Fn1 is an index of precipitation nuclei generation sites for fine carbides and the like. If Fn1 is 1.20 or less, the precipitation nuclei generation sites may be insufficient. In this case, when carburizing treatment is performed, fine V carbides and the like may not sufficiently precipitate. Therefore, wear resistance of the carburized bearing part may not be sufficiently obtained. On the other hand, if Fn1 is 2.75 or more, precipitation nuclei generation sites may excessively increase. In this case, although the wear resistance of the carburized bearing part may increase, undissolved carbides and the like may remain in the steel material for a carburized bearing part. In this case, coarse V carbides and the like may be present in the carburized bearing part after carburizing treatment. Coarse V carbides and the like inside the carburized bearing part decrease the surface initiated spalling life and toughness of the carburized bearing part.

If Fn1 is more than 1.20 and less than 2.75, excellent wear resistance, excellent surface initiated spalling life and excellent toughness are obtained in the carburized bearing part. A preferable lower limit of Fn1 is 1.30, more preferably is 1.40, and further preferably is 1.50. A preferable upper limit of Fn1 is 2.60, more preferably is 2.50, and further preferably is 2.40.

[Regarding Formula (2)]

Sulfides in the steel material for a carburized bearing part of the present embodiment satisfy Formula (2).

$$A1/A2 > 0.50 \qquad (2)$$

In Formula (2), "A1" represents a gross area ($\mu m^2$) of sulfides containing Ca in an amount of 1 mol % or more and having an equivalent circular diameter of 1 μm or more in an observation region with a gross area of 4 $mm^2$ or more in a cross section that is parallel to a rolling direction. "A2" represents a gross area ($\mu m^2$) of sulfides having an equivalent circular diameter of 1 μm or more in the aforementioned observation region. Here, the "rolling direction" corresponds to the longitudinal direction (axial direction) of the steel material for a carburized bearing part.

It is defined that Fn2=A1/A2. Fn2 is an index that indicates the proportion of sulfides in a spheroidal state (proportion of sulfides with a small aspect ratio) among sulfides of a size with an equivalent circular diameter of 1 μm or more in the steel material for a carburized bearing part. If Fn2 is 0.50 or less, the proportion of Ca-containing sulfides which are sulfides in which the content of Ca is 1 mol % or more among sulfides with an equivalent circular diameter of 1 μm or more in the steel material for a carburized bearing part is small. That is, among sulfides with an equivalent circular diameter of 1 μm or more in the steel material for a carburized bearing part, the proportion of non-Ca-containing sulfides which are sulfides in which the content of Ca is less than 1 mol % is large. As described above, Ca-containing sulfides are not liable to elongate even when subjected to hot working, and maintain a spheroidal state. That is, the aspect ratio (aspect ratio=major axis/minor axis of sulfides) of Ca-containing sulfides is maintained at a small ratio even when subjected to hot rolling. On the other hand, non-Ca-containing sulfides elongate when subjected to hot rolling. That is, the aspect ratio of non-Ca-containing sulfides increases when subjected to hot rolling. In a case where Fn2 is 0.50 or less, among sulfides with an equivalent circular diameter of 1 μm or more in the steel material for a carburized bearing part, the proportion of non-Ca-containing sulfides whose shape after hot rolling becomes an elongated state is large. In this case, in an environment in which foreign matter such as earth and sand or a part of a rock enters inside a carburized bearing that is being used for mining machinery or for construction machinery, not only coarse sulfides in the carburized bearing part but also fine sulfides act as initiation points of fatigue, and decrease the surface initiated spalling life of the carburized bearing part.

When Fn2 is more than 0.50, the proportion of Ca-containing sulfides which are sulfides that contain Ca is sufficiently large among sulfides with an equivalent circular diameter of 1 μm or more in the steel material for a carburized bearing part. That is, among sulfides with an equivalent circular diameter of 1 μm or more in the steel material for a carburized bearing part, the proportion of sulfides that maintain a spheroidal state even after hot rolling is sufficiently large. Therefore, initiation points of fatigue can be reduced in the carburized bearing part, and as a result, even in the case of using a carburized bearing part in an environment in which foreign matter enters inside the carburized bearing part, the surface initiated spalling life can be sufficiently increased. A preferable lower limit of Fn2 is 0.52, more preferably is 0.55, further preferably is 0.57, and more preferably is 0.60.

Fn2 is determined by the following method. As illustrated in FIG. 1, a cubic test specimen 10 with 10 mm sides is extracted from an arbitrary central part including a central axis C1 that corresponds to the rolling direction of a steel material 1 for a carburized bearing part. That is, the extracted cubic test specimen 10 includes the central axis C1. Among the six surfaces of this cubic test specimen, any of four surfaces S10 which are parallel to the central axis C1 is taken as the suspected area. The suspected area S10 is a 10 mm×10 mm square. The suspected area S10 is parallel to the central axis C1 of the steel material for a carburized bearing part. That is, the suspected area S10 is parallel to the rolling direction of the steel material 1 for a carburized bearing part. After embedding the cubic test specimen 10 in resin, the suspected area S10 is mirror polished.

After mirror polishing, sulfides inside the suspected area S10 are identified by SEM (scanning electron microscopy). Specifically, observation regions are selected at 100 arbitrary locations inside the suspected area S10 at a magnitude of ×500. The gross area of the observation regions (that is, the gross area of the observation regions at 100 locations) is made 4 $mm^2$ or more. In each observation region, sulfides are identified based on the contrast of a backscattered electron image observed with SEM. In the backscattered electron image, observation regions are displayed with grayscale images. The respective contrasts of the parent phase, sulfides and oxides differ from each other in the backscattered electron image.

The numerical value range of brightness that indicates a sulfide (multiple levels of gradation) is determined in advance by means of SEM and an EDS (Energy Dispersive X-ray micro analyzer). Hereunder, the numerical value range that is determined in advance as brightness that indicates a sulfide is referred to as a "reference range". In the observation regions, regions in which the brightness falls within the reference range are determined. Hereunder, a region in which the brightness falls within the reference range is referred to as a "sulfide region".

Figure 2:
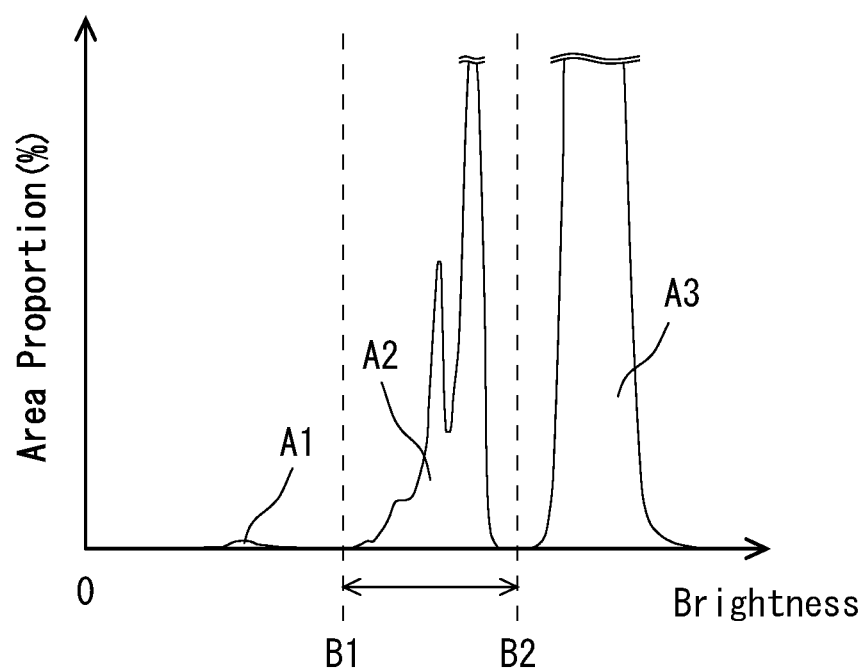
FIG. 2 is a schematic diagram illustrating an example of the relation between the brightness of a region and the area proportion of the region having the corresponding brightness in a case where the brightness in an SEM image of arbitrary regions in a steel material for a carburized bearing part is shown using multiple levels of gradation.
Figure 3:
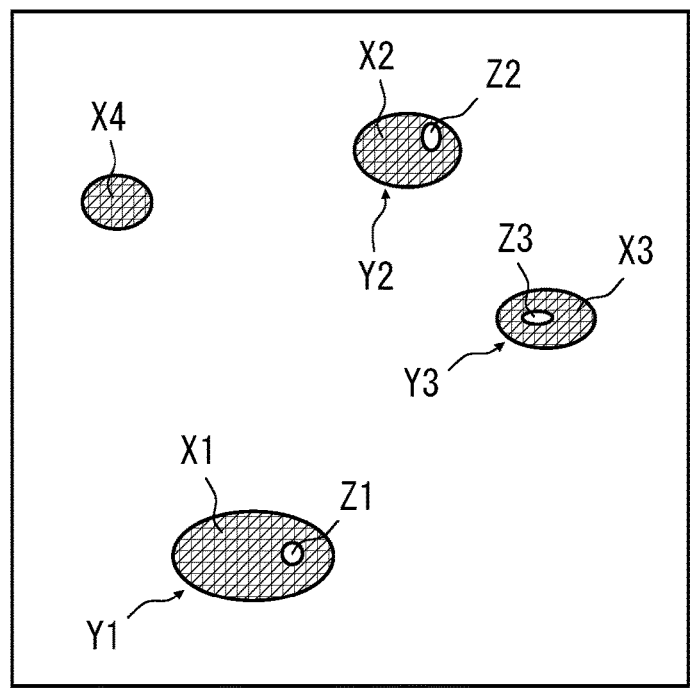
FIG. 3 is a schematic diagram illustrating an example of an SEM image of arbitrary regions in a steel material for a carburized bearing part.

FIG. 2 is a schematic diagram illustrating an example of the brightness distribution of an SEM image in an observation region. The abscissa in FIG. 2 represents the brightness. The ordinate in FIG. 2 represents the area proportion (%) of the corresponding brightness in the observation region. A region A1 in FIG. 2 indicates oxides. A region A2 indicates sulfides. A region A3 indicates the Fe parent phase. In the case of FIG. 2, a brightness range from B1 to B2 in FIG. 2 is determined as the reference range. Next, regions in which the brightness is within the reference range B1 to B2 are determined from the observation region. FIG. 3 is a schematic diagram of an SEM image of an observation region. Regions X1 to X4 in FIG. 3 are regions which have a brightness within the reference range B1 to B2, and these regions correspond to sulfides. Therefore, the regions X1 to X4 are identified as sulfide regions. Note that, regions Z1 to Z3 in regions Y1 to Y3 in FIG. 3 are regions that correspond to oxides. That is, regions Y1 to Y3 are composite inclusions composed of sulfides and oxides.

The equivalent circular diameter of each of the identified sulfide regions X1 to X4 is calculated. The term equivalent circular diameter means the diameter of a circle in a case where the area of each of the sulfide regions X1 to X4 is converted into a circle having the same area. When calculating the equivalent circular diameter of the sulfide regions X1 to X4, the equivalent circular diameters are calculated by excluding the area of oxides (regions Z1 to Z3 in FIG. 3) that exist in the respective sulfide regions. The gross area ($\mu m^2$) of sulfide regions for which the calculated equivalent circular diameter is 1 $\mu m$ or more in the observation regions (gross area of 4 $mm^2$ or more) at the 100 locations is defined as A2.

Next, the gross area A1 of sulfides containing Ca in an amount of 1 mol % or more and also having an equivalent circular diameter of 1 $\mu m$ or more is determined by the following method. Each sulfide region having an equivalent circular diameter of 1 $\mu m$ or more in the aforementioned observation regions (gross area of 4 $mm^2$ or more) at 100 locations is subjected to quantitative analysis by EDS. Among the respective sulfide regions subjected to quantitative analysis, regions of sulfides containing Ca in an amount of 1 mol % or more are identified.

A semi-quantitative analysis method is used for the EDS quantitative analysis of Ca in the sulfides. As mentioned above, composite inclusions containing sulfides and oxides are also present in the observation regions, and not just independent sulfides.

It is assumed that sulfide regions identified by means of the SEM image are sulfides contained in composite inclusions. In this case, even if incident electrons of the EDS apparatus aimed at sulfides are incident thereon, in some cases, the incident electrons strike not only the sulfides but also oxides that are adjacent to the sulfides. In such a case, an analysis value for the oxides is also included in the analysis result, and not just an analysis value for the sulfides. There is a possibility that the oxides are Ca oxides. Therefore, there is a possibility that the component analysis value for the sulfides includes an amount of Ca that is larger than the actual amount of Ca in the sulfides. Therefore, the Ca amount of sulfides is calculated semi-quantitatively by the following method.

Apart from S, sulfides in the aforementioned steel material for a carburized bearing part substantially contain Mn, Ca and Fe. Mn, Ca and Fe combine preferentially with S in that order to form MnS, CaS and FeS. Therefore, the content of Ca in the sulfides is subjected to semi-quantitative analysis by utilizing this property. The semi-quantitative method is as described hereunder. The respective contents described hereunder are described in "mol %".

The content of S and the content of Mn in the sulfides measured by EDS quantitative analysis are compared. In a case where the content of S is less than the content of Mn, it is determined that MnS is formed in the analyzed sulfide region, and Ca is not contained therein. In this case, it is considered that Mn of an amount corresponding to a differential value obtained by subtracting the content of S from the content of Mn is contained in oxides. On the other hand, in a case where the content of S is greater than the content of Mn, it is determined that Ca of an amount corresponding to a differential value obtained by subtracting the content of Mn from the content of S is contained in the sulfide region as CaS. In a case where the content of Ca is greater than the differential value, it is determined that Ca of an amount corresponding to the amount of the excess forms oxides as CaO. Note that, in a case where the measured content of Ca is less than differential value, it is determined that FeS is also formed in the sulfide region.

By means of the above semi-quantitative measurement method, the content of Ca in each sulfide region having an equivalent circular diameter of 1 $\mu m$ or more is identified. The gross area ($\mu m^2$) of sulfide regions having an equivalent circular diameter of 1 $\mu m$ or more and containing Ca in an amount of 1 mol % or more is then determined, and the determined gross area is defined as A1. Note that, when calculating A1 also, A1 is calculated by excluding the area of oxides (regions Z1 to Z3 in FIG. 3) that are present in the sulfide regions.

Fn2 is determined by using the gross areas A1 and A2 defined by the above method. Note that, the reason for taking 1 $\mu m$ or more as the size of the equivalent circular diameter of the target sulfides in the quantitative analysis is that it is difficult to accurately perform composition analysis by semi-quantitative analysis using EDS with respect to sulfides having an equivalent circular diameter of less than 1 $\mu m$ in the aforementioned method and also that when Fn2 is determined taking sulfides having an equivalent circular diameter of 1 $\mu m$ or more as a target, a sufficient correlation with the surface initiated spalling life of a carburized bearing part is obtained. Although the upper limit of the equivalent circular diameter of the sulfides is not particularly limited, in the chemical composition and production process of the present embodiment, the maximum value of the equivalent circular diameter of the sulfides is, for example, 500 $\mu m$, and preferably is 200 $\mu m$.

[Regarding Formula (3)]

Based on the premise that the respective elements satisfy the respective ranges described above, the chemical composition of the steel material for a carburized bearing part of the present embodiment also satisfies Formula (3):

$$2.7C+0.4Si+Mn+0.45Ni+0.8Cr+Mo+V>2.55 \qquad (3)$$

where, the content (mass %) of the corresponding element is substituted for each symbol of an element in Formula (3). If the corresponding element is not contained, "0" is substituted for the symbol of the relevant element.

It is defined that Fn3=2.7C+0.4Si+Mn+0.45Ni+0.8Cr+Mo+V. Fn3 is an index of hardenability. If Fn3 is 2.55 or less, the hardenability may be low. In this case, the hardness of the core portion of the steel material after quenching decreases. Consequently, the strength of the carburized bearing part decreases. Therefore, Fn3 is more than 2.55. A preferable lower limit of Fn3 is 2.70, more preferably is 2.85, and further preferably is 3.00.

[Method for Producing Steel Material for a Carburized Bearing Part]

One example of a method for producing the aforementioned steel material for a carburized bearing part will now be described. The method for producing a steel material for a carburized bearing part that is described hereinafter is one example for producing the steel material for a carburized bearing part of the present embodiment. Therefore, the steel material for a carburized bearing part having the aforementioned composition may also be produced by another production method other than the production method that is described hereinafter. However, the production method that is described hereinafter is a preferable example of a method for producing the steel material for a carburized bearing part of the present embodiment. In the present embodiment, a method for producing a steel bar or a wire rod as an example of a steel material for a carburized bearing part is described.

One example of a method for producing the steel material for a carburized bearing part of the present embodiment includes a steel making process of refining and casting molten steel to produce a starting material (a cast piece), and a hot working process of subjecting the starting material to hot working to produce a steel material for a carburized bearing part. Each process is described hereunder.

[Steel Making Process]

The steel making process includes a refining process and a casting process.

[Refining Process]

In the refining process, first, molten steel having the aforementioned chemical composition that satisfies Formula (1) and Formula (3) is produced. The specific method for the refining process is not particularly limited as long as molten steel having the aforementioned chemical composition that satisfies Formula (1) and Formula (3) can be produced. The refining process is carried out, for example, by the following method. Hot metal produced by a well-known method is subjected to refining (primary refining) using a converter. Molten steel tapped from the converter is subjected to a well-known secondary refining. In the secondary refining, alloying elements subjected to composition adjustment are added to thereby produce a molten steel that satisfies the aforementioned chemical composition.

[Casting Process]

The molten steel produced in the refining process is moved to a tundish of a continuous casting machine. In the casting process, the molten steel temperature inside the tundish is held for 12 to 100 minutes within a range of the liquidus temperature +50° C. to the liquidus temperature +100° C. Hereunder, the circumstances regarding holding of the molten steel temperature in the tundish are described.

In order to satisfy the aforementioned Formula (2), it is necessary for Ca to be contained in not only coarse sulfides that are formed when a plurality of sulfides agglomerate, but also in fine sulfides with respect to which it is difficult for agglomeration to occur. If a large quantity of CaO is present in the molten steel, it is easy for Ca to be contained in fine sulfides also. If the content of Ca that is contained in the molten steel is within the range of 2 to 10 ppm, a large quantity of CaO can be dispersed in the molten steel.

In addition, Ca is caused to exist in a liquid phase state in the molten steel. Specifically, Ca is caused to exist as AlCaO. In the molten steel, AlCaO exists in liquid phase. Ca-containing sulfides are easily formed by Ca in the liquid phase AlCaO combining with MnS. The crystallization temperature of Ca-containing sulfides is a higher temperature than the crystallization temperature of non-Ca-containing sulfides. Therefore, the molten steel temperature within the tundish is held within the range of the liquidus temperature +50° C. to the liquidus temperature +100° C. for 12 to 100 minutes. In this case, within the tundish, a large number of Ca-containing sulfides can be formed in a state in which the AlCaO in liquid phase is present in the molten steel.

In a case where the holding time of the molten steel temperature within the range of the liquidus temperature +50° C. to the liquidus temperature +100° C. is less than 12 minutes, before the Ca-containing sulfides crystallize, the CaO may crystallize and the Ca may become solid phase. Consequently, it may be difficult for Ca-containing sulfides to be formed, and a large number of non-Ca-containing sulfides may be formed. In this case, although coarse sulfides that are formed as a result of a plurality of sulfides agglomerating may contain Ca in an amount of 1 mol % or more, with respect to fine sulfides, a large number of non-Ca-containing fine sulfides which do not contain Ca may be formed. Therefore, Fn2 is liable to become 0.50 or less.

On the other hand, if the holding time of the molten steel temperature within the range of the liquidus temperature +50° C. to the liquidus temperature +100° C. is more than 100 minutes, although Ca-containing sulfides may be formed, the Ca-containing sulfides that are formed may agglomerate and float, and may be absorbed by slag on the liquid surface of the molten steel. Consequently, the amount of Ca-containing sulfides in the molten steel may decrease.

In this case, because the Ca-containing sulfides in the molten steel decrease and non-Ca-containing sulfides are formed together with a decrease in the molten steel temperature, Fn2 is liable to become 0.50 or less.

By making the holding time of the molten steel temperature in the tundish within the range of the liquidus temperature +50° C. to the liquidus temperature +100° C. between 12 and 100 minutes, Ca-containing sulfides can be sufficiently formed. Therefore, among the sulfides in the steel material, the proportion of Ca-containing sulfides can be increased, and Fn2 can be made greater than 0.50.

A preferable lower limit of the holding time of the molten steel temperature within the range of the liquidus temperature +50° C. to the liquidus temperature +100° C. is 15 minutes, more preferably is 18 minutes, and further preferably is 20 minutes. A preferable upper limit of the holding time of the molten steel temperature within the range of the liquidus temperature +50° C. to the liquidus temperature +100° C. is 90 minutes, more preferably is 80 minutes, and further preferably is 70 minutes.

For the molten steel having the aforementioned chemical composition, the range of the liquidus temperature +50° C. to the liquidus temperature +100° C. is, for example, 1550 to 1650° C. Preferably, the holding time of the molten steel temperature in the range from 1550 to 1600° C. is between 12 and 100 minutes.

Note that, the molten steel temperature in the tundish is adjusted using a well-known tundish internal heating device (tundish heater). The tundish heater may be, for example, a plasma heating-type heater or may be of an induction heating-type heater.

The molten steel held within the aforementioned temperature range in the tundish is poured into a mold, and a starting material (cast piece) is produced by a continuous casting process. The cast piece that is the starting material is a bloom or a billet.

[Hot Working Process]

The produced starting material is subjected to hot working to produce steel material for a carburized bearing part (steel bar or wire rod). In the hot working process, hot working is usually performed once or a plurality of times. In the case of performing hot working a plurality of times, the initial hot working is, for example, rolling (rough rolling) using blooming or hot forging, and from the next hot working onward, rolling using a continuous mill is performed. In the continuous mill, a horizontal stand having a pair of horizontal rolls, and a vertical stand having a pair of vertical rolls are alternately arranged in a row. The steel material for a carburized bearing part after finish rolling is cooled until becoming room temperature. By means of the rolling performed using rough rolling and a continuous mill, a billet is produced, and thereafter the billet is reheated, rolling is performed again using a continuous mill, and a steel bar or wire rod of a desired size may be produced.

The steel material for a carburized bearing part according to the present embodiment is produced by the above process. Note that, as necessary, the steel material after the hot working process may be subjected to a normalizing treatment or spheroidizing annealing treatment may be performed to produce the steel material for a carburized bearing part.

[Method for Producing Carburized Bearing Part]

An example of a method for producing a carburized bearing part using the steel material for a carburized bearing part of the present embodiment is as follows.

The steel material for a carburized bearing part is subjected to hot forging to produce an intermediate product. The intermediate product is subjected to machining. The machining is, for example, cutting. The intermediate product after hot forging may also be subjected to cold forging to produce an intermediate product.

A carburizing treatment is performed on the intermediate product after machining. The carburizing treatment may be performed using well-known conditions. The carburizing treatment may be a gas carburizing treatment, a vacuum carburizing treatment, or a plasma carburizing treatment. The carburizing treatment includes a carburizing process and a quenching process. In the carburizing process, the intermediate product is held for a predetermined time period at a carburizing temperature. The carburizing temperature is the $A_{c3}$ transformation point or higher, and for example is in the range of 850 to 1100° C. For example, in a carburizing process in a gas carburizing treatment, endothermic converted gas (RX gas) as carrier gas is charged into a furnace. The RX gas is gas obtained by mixing a hydrocarbon gas such as butane and propane and air, and causing a heated Ni catalyst to pass therethrough to cause a reaction, and is a gaseous mixture including CO, H2, N2 or the like. Furthermore, in the carburizing process in the gas carburizing treatment, an enriched gas that is a hydrocarbon gas such as butane or propane is charged into a furnace. In the carburizing process, the amount of enriched gas is controlled according to the target value for the surface carbon concentration, and the holding time in the carburizing process is adjusted according to the target value for the carburized depth. The carbon concentration in the surface of the carburized bearing part is, for example, 0.6 to 0.8%. The holding time in the carburizing process is, for example, 2 to 15 hours. Following the carburizing process, the quenching process is performed inside the same furnace. In the quenching process, the intermediate product is held at a quenching temperature for a predetermined time period. The quenching temperature is, for example, 800 to 900° C. After being held at the quenching temperature for a predetermined time period, the intermediate product is rapidly cooled. The rapid cooling method may be water cooling or may be oil cooling.

While the intermediate product is being held at the aforementioned quenching temperature (800 to 900° C.) in the quenching process, a nitriding process in which ammonia gas is caused to flow into the furnace may also be performed. The flow rate of the ammonia gas is controlled in accordance with the target surface nitriding concentration. The target value for the surface nitrogen concentration is, for example, within the range of 0.1 to 0.6%.

The intermediate product after the carburizing treatment (after the quenching process) is subjected to well-known tempering. The tempering temperature is, for example, within the range of 140 to 250° C., and the holding time is within the range of 1 to 3 hours.

A carburized bearing part is produced by the above process. A carburized bearing part that is produced by a well-known carburizing treatment using the steel material for a carburized bearing part of the present embodiment is excellent in wear resistance and surface initiated spalling life.

EXAMPLES

Molten steels having the various chemical compositions shown in Table 1 were produced using a converter.

TABLE 1

| Test No. | Chemical Composition (unit is mass %; balance is Fe and impurities) | | | | | | | | | |
|---|---|---|---|---|---|---|---|---|---|---|
| | C | Si | Mn | P | S | Cr | Mo | V | Al | Ca |
| 1 | 0.25 | 0.32 | 0.70 | 0.008 | 0.005 | 1.25 | 0.25 | 0.25 | 0.030 | 0.0009 |
| 2 | 0.45 | 0.20 | 0.95 | 0.009 | 0.003 | 0.89 | 0.19 | 0.23 | 0.035 | 0.0007 |
| 3 | 0.40 | 0.15 | 0.80 | 0.008 | 0.004 | 1.21 | 0.25 | 0.31 | 0.025 | 0.0005 |
| 4 | 0.36 | 0.45 | 1.30 | 0.010 | 0.003 | 1.40 | 0.10 | 0.37 | 0.012 | 0.0006 |
| 5 | 0.42 | 0.37 | 0.40 | 0.008 | 0.003 | 1.18 | 0.21 | 0.27 | 0.045 | 0.0005 |
| 6 | 0.28 | 0.26 | 1.50 | 0.011 | 0.004 | 1.00 | 0.31 | 0.22 | 0.038 | 0.0005 |
| 7 | 0.32 | 0.18 | 1.15 | 0.008 | 0.004 | 0.60 | 0.35 | 0.26 | 0.040 | 0.0002 |
| 8 | 0.39 | 0.40 | 1.40 | 0.008 | 0.004 | 2.00 | 0.25 | 0.20 | 0.042 | 0.0006 |
| 9 | 0.43 | 0.30 | 0.80 | 0.007 | 0.003 | 1.80 | 0.10 | 0.30 | 0.033 | 0.0004 |
| 10 | 0.26 | 0.25 | 0.60 | 0.007 | 0.003 | 1.70 | 0.35 | 0.24 | 0.028 | 0.0005 |
| 11 | 0.34 | 0.25 | 0.76 | 0.008 | 0.003 | 1.07 | 0.20 | 0.20 | 0.028 | 0.0006 |
| 12 | 0.42 | 0.27 | 0.58 | 0.009 | 0.004 | 1.30 | 0.30 | 0.40 | 0.030 | 0.0010 |
| 13 | 0.42 | 0.32 | 1.35 | 0.010 | 0.003 | 0.65 | 0.12 | 0.20 | 0.031 | 0.0008 |
| 14 | 0.38 | 0.45 | 0.80 | 0.010 | 0.003 | 1.85 | 0.35 | 0.40 | 0.041 | 0.0003 |
| 15 | 0.26 | 0.15 | 0.70 | 0.008 | 0.004 | 0.90 | 0.15 | 0.23 | 0.029 | 0.0005 |
| 16 | 0.40 | 0.34 | 0.60 | 0.008 | 0.003 | 1.20 | 0.24 | 0.29 | 0.034 | 0.0002 |
| 17 | 0.45 | 0.16 | 1.50 | 0.007 | 0.004 | 1.90 | 0.27 | 0.30 | 0.040 | 0.0008 |
| 18 | 0.30 | 0.18 | 0.50 | 0.019 | 0.005 | 1.14 | 0.33 | 0.29 | 0.045 | 0.0005 |
| 19 | 0.35 | 0.25 | 1.14 | 0.013 | 0.019 | 1.30 | 0.25 | 0.25 | 0.030 | 0.0010 |
| 20 | 0.23 | 0.30 | 0.80 | 0.011 | 0.004 | 1.16 | 0.34 | 0.30 | 0.034 | 0.0008 |
| 21 | 0.50 | 0.20 | 0.63 | 0.010 | 0.004 | 1.32 | 0.25 | 0.27 | 0.041 | 0.0007 |
| 22 | 0.38 | 0.11 | 0.60 | 0.008 | 0.003 | 1.28 | 0.15 | 0.31 | 0.029 | 0.0006 |
| 23 | 0.42 | 0.50 | 0.71 | 0.007 | 0.003 | 1.65 | 0.22 | 0.22 | 0.033 | 0.0005 |
| 24 | 0.30 | 0.25 | 0.35 | 0.007 | 0.005 | 1.46 | 0.20 | 0.25 | 0.043 | 0.0006 |
| 25 | 0.44 | 0.40 | 1.70 | 0.009 | 0.005 | 1.10 | 0.30 | 0.26 | 0.030 | 0.0004 |
| 26 | 0.43 | 0.20 | 1.45 | 0.009 | 0.004 | 0.40 | 0.27 | 0.21 | 0.046 | 0.0007 |
| 27 | 0.32 | 0.33 | 0.50 | 0.008 | 0.003 | 2.40 | 0.12 | 0.28 | 0.028 | 0.0002 |
| 28 | 0.40 | 0.28 | 0.43 | 0.009 | 0.003 | 1.50 | 0.06 | 0.24 | 0.026 | 0.0003 |
| 29 | 0.35 | 0.24 | 0.80 | 0.007 | 0.004 | 1.05 | 0.50 | 0.38 | 0.025 | 0.0007 |
| 30 | 0.38 | 0.30 | 0.70 | 0.012 | 0.004 | 1.40 | 0.35 | 0.15 | 0.038 | 0.0005 |
| 31 | 0.45 | 0.17 | 1.40 | 0.010 | 0.003 | 0.95 | 0.12 | 0.50 | 0.039 | 0.0009 |
| 32 | 0.38 | 0.24 | 1.28 | 0.010 | 0.003 | 0.60 | 0.11 | 0.20 | 0.040 | 0.0008 |
| 33 | 0.25 | 0.15 | 0.82 | 0.009 | 0.004 | 0.83 | 0.10 | 0.20 | 0.029 | 0.0006 |
| 34 | 0.34 | 0.22 | 0.72 | 0.009 | 0.005 | 1.00 | 0.23 | 0.21 | 0.028 | 0.0001 |

TABLE 1-continued

| Test No. | C | Si | Mn | P | S | Cr | Mo | V | Al | Ca |
|---|---|---|---|---|---|---|---|---|---|---|
| 35 | 0.35 | 0.20 | 0.87 | 0.008 | 0.005 | 1.07 | 0.19 | 0.24 | 0.030 | 0.0016 |
| 36 | 0.36 | 0.24 | 0.83 | 0.008 | 0.004 | 1.10 | 0.21 | 0.22 | 0.033 | — |
| 37 | 0.45 | 0.26 | 0.76 | 0.010 | 0.007 | 1.95 | 0.10 | 0.39 | 0.029 | 0.0005 |
| 38 | 0.40 | 0.21 | 1.10 | 0.007 | 0.005 | 1.30 | 0.23 | 0.31 | 0.035 | 0.0004 |
| 39 | 0.40 | 0.32 | 0.85 | 0.008 | 0.005 | 1.50 | 0.21 | 0.31 | 0.029 | 0.0006 |

| | Chemical Composition | | | | | | | | |
|---|---|---|---|---|---|---|---|---|---|
| Test | (unit is mass %; balance is Fe and impurities) | | | | | | | | |
| No. | N | O | Ni | B | Nb | Ti | Fn1 | Fn2 | Fn3 |
| 1 | 0.0058 | 0.0010 | — | — | — | — | 1.73 | 0.72 | 3.00 |
| 2 | 0.0068 | 0.0009 | — | — | — | — | 1.47 | 0.58 | 3.38 |
| 3 | 0.0072 | 0.0009 | — | — | — | — | 1.98 | 0.56 | 3.47 |
| 4 | 0.0093 | 0.0008 | — | — | — | 0.04 | 2.27 | 0.60 | 4.04 |
| 5 | 0.0060 | 0.0008 | — | — | — | — | 1.77 | 0.53 | 3.11 |
| 6 | 0.0070 | 0.0008 | — | 0.0005 | — | — | 1.51 | 0.55 | 3.69 |
| 7 | 0.0114 | 0.0010 | — | — | — | 0.08 | 1.55 | 0.51 | 3.18 |
| 8 | 0.0148 | 0.0007 | — | — | — | — | 1.80 | 0.59 | 4.66 |
| 9 | 0.0080 | 0.0009 | 0.05 | — | — | — | 2.11 | 0.66 | 3.94 |
| 10 | 0.0095 | 0.0007 | — | — | 0.100 | — | 1.90 | 0.65 | 3.35 |
| 11 | 0.0068 | 0.0009 | — | — | — | — | 1.41 | 0.67 | 3.03 |
| 12 | 0.0098 | 0.0008 | — | — | — | — | 2.44 | 0.76 | 3.56 |
| 13 | 0.0071 | 0.0008 | — | — | 0.050 | — | 1.21 | 0.70 | 3.45 |
| 14 | 0.0057 | 0.0008 | — | — | — | — | 2.68 | 0.53 | 4.24 |
| 15 | 0.0084 | 0.0007 | — | 0.0005 | — | — | 1.46 | 0.59 | 2.56 |
| 16 | 0.0060 | 0.0009 | 0.60 | — | — | — | 1.88 | 0.53 | 3.58 |
| 17 | 0.0094 | 0.0010 | — | — | — | — | 2.22 | 0.71 | 4.87 |
| 18 | 0.0110 | 0.0010 | — | — | — | — | 1.89 | 0.68 | 2.91 |
| 19 | 0.0055 | 0.0010 | — | — | — | — | 1.75 | 0.53 | 3.73 |
| 20 | 0.0060 | 0.0009 | — | — | — | — | 1.95 | 0.65 | 3.11 |
| 21 | 0.0094 | 0.0007 | — | — | — | — | 1.84 | 0.63 | 3.64 |
| 22 | 0.0071 | 0.0007 | — | — | — | — | 1.97 | 0.68 | 3.15 |
| 23 | 0.0057 | 0.0008 | — | — | — | — | 1.74 | 0.65 | 3.80 |
| 24 | 0.0170 | 0.0007 | — | — | — | — | 1.79 | 0.58 | 2.88 |
| 25 | 0.0126 | 0.0009 | — | — | — | — | 1.73 | 0.57 | 4.49 |
| 26 | 0.0095 | 0.0010 | — | — | — | — | 1.21 | 0.56 | 3.49 |
| 27 | 0.0074 | 0.0010 | — | — | — | — | 2.27 | 0.53 | 3.82 |
| 28 | 0.0086 | 0.0008 | — | — | — | — | 1.70 | 0.56 | 3.12 |
| 29 | 0.0108 | 0.0008 | — | — | — | — | 2.33 | 0.63 | 3.56 |
| 30 | 0.0127 | 0.0007 | 0.09 | — | — | — | 1.38 | 0.69 | 3.51 |
| 31 | 0.0063 | 0.0007 | — | — | — | — | 2.68 | 0.70 | 4.06 |
| 32 | 0.0089 | 0.0009 | — | — | 0.030 | — | 1.18 | 0.67 | 3.19 |
| 33 | 0.0064 | 0.0009 | 0.05 | — | — | — | 1.27 | 0.57 | 2.53 |
| 34 | 0.0095 | 0.0008 | — | — | — | — | 1.44 | 0.47 | 2.97 |
| 35 | 0.0084 | 0.0009 | — | — | — | — | 1.58 | 0.73 | 3.18 |
| 36 | 0.0068 | 0.0009 | — | — | — | — | 1.51 | 0 | 3.21 |
| 37 | 0.0096 | 0.0009 | — | — | — | — | 2.58 | 0.51 | 4.13 |
| 38 | 0.0063 | 0.0007 | — | — | — | — | 2.01 | 0.39 | 3.84 |
| 39 | 0.0062 | 0.0009 | — | — | — | — | 2.08 | 0.35 | 3.78 |

Cast pieces were produced by performing continuous casting using the aforementioned molten steels. Note that, during the continuous casting, a holding time τ (min) at a molten steel temperature within the range of the liquidus temperature +50° C. to the liquidus temperature +100° C. within the tundish was the time shown in Table 2.

TABLE 2

| Test No. | Fn1 | Fn2 | Fn3 | Holding Time τ (min) | Hardenability $J_{11}$ (HRC) | Evaluation | Toughness $vE_{20}$ (J/cm$^2$) | Evaluation | Wear Resistance Surface C (%) |
|---|---|---|---|---|---|---|---|---|---|
| 1 | 1.73 | 0.72 | 3.00 | 50 | 35 | E | 54.5 | E | 0.82 |
| 2 | 1.47 | 0.58 | 3.38 | 60 | 56 | E | 18.6 | E | 0.81 |
| 3 | 1.98 | 0.56 | 3.47 | 40 | 51 | E | 20.0 | E | 0.81 |
| 4 | 2.27 | 0.60 | 4.04 | 50 | 42 | E | 29.2 | E | 0.82 |
| 5 | 1.77 | 0.53 | 3.11 | 40 | 49 | E | 19.5 | E | 0.80 |
| 6 | 1.51 | 0.55 | 3.69 | 40 | 37 | E | 47.6 | E | 0.81 |
| 7 | 1.55 | 0.51 | 3.18 | 70 | 40 | E | 38.4 | E | 0.82 |
| 8 | 1.80 | 0.59 | 4.66 | 40 | 50 | E | 22.3 | E | 0.81 |
| 9 | 2.11 | 0.66 | 3.94 | 60 | 53 | E | 19.2 | E | 0.81 |
| 10 | 1.90 | 0.65 | 3.35 | 30 | 37 | E | 52.2 | E | 0.80 |
| 11 | 1.41 | 0.67 | 3.03 | 20 | 43 | E | 33.8 | E | 0.82 |
| 12 | 2.44 | 0.76 | 3.56 | 60 | 52 | E | 19.5 | E | 0.82 |

TABLE 2-continued

| | | | | | | | | | |
|---|---|---|---|---|---|---|---|---|---|
| 13 | 1.21 | 0.70 | 3.45 | 60 | 52 | E | 19.5 | E | 0.80 |
| 14 | 2.68 | 0.53 | 4.24 | 50 | 51 | E | 24.6 | E | 0.80 |
| 15 | 1.46 | 0.59 | 2.56 | 70 | 38 | E | 52.2 | E | 0.81 |
| 16 | 1.88 | 0.53 | 3.58 | 90 | 51 | E | 20.0 | E | 0.81 |
| 17 | 2.22 | 0.71 | 4.87 | 15 | 58 | E | 18.6 | E | 0.82 |
| 18 | 1.89 | 0.68 | 2.91 | 40 | 40 | E | 14.8 | NA | 0.82 |
| 19 | 1.75 | 0.53 | 3.73 | 60 | 41 | E | 13.4 | NA | 0.81 |
| 20 | 1.95 | 0.65 | 3.11 | 50 | 29 | NA | 59.1 | E | 0.81 |
| 21 | 1.84 | 0.63 | 3.64 | 40 | 59 | E | 12.7 | NA | 0.80 |
| 22 | 1.97 | 0.68 | 3.15 | 50 | 44 | E | 24.6 | E | 0.80 |
| 23 | 1.74 | 0.65 | 3.80 | 60 | 48 | E | 13.5 | NA | 0.82 |
| 24 | 1.79 | 0.58 | 2.88 | 60 | 39 | E | 43.0 | E | 0.82 |
| 25 | 1.73 | 0.57 | 4.49 | 60 | 57 | E | 11.8 | NA | 0.80 |
| 26 | 1.21 | 0.56 | 3.49 | 40 | 55 | E | 19.2 | E | 0.80 |
| 27 | 2.27 | 0.53 | 3.82 | 40 | 40 | E | 14.9 | NA | 0.80 |
| 28 | 1.70 | 0.56 | 3.12 | 30 | 50 | E | 20.0 | E | 0.81 |
| 29 | 2.33 | 0.63 | 3.56 | 20 | 41 | E | 31.5 | E | 0.81 |
| 30 | 1.38 | 0.69 | 3.51 | 40 | 50 | E | 24.6 | E | 0.82 |
| 31 | 2.68 | 0.70 | 4.06 | 60 | 53 | E | 10.8 | NA | 0.82 |
| 32 | 1.18 | 0.67 | 3.19 | 30 | 48 | E | 24.6 | E | 0.81 |
| 33 | 1.27 | 0.57 | 2.53 | 50 | 31 | NA | 54.5 | E | 0.80 |
| 34 | 1.44 | 0.47 | 2.97 | 70 | 44 | E | 35.2 | E | 0.80 |
| 35 | 1.58 | 0.73 | 3.18 | 50 | 47 | E | 38.6 | E | 0.80 |
| 36 | 1.51 | 0 | 3.21 | 60 | 48 | E | 36.8 | E | 0.81 |
| 37 | 2.58 | 0.51 | 4.13 | 40 | 58 | E | 19.1 | E | 0.81 |
| 38 | 2.01 | 0.39 | 3.84 | 10 | 51 | E | 18.0 | E | 0.80 |
| 39 | 2.08 | 0.35 | 3.78 | 150 | 49 | E | 18.6 | NA | 0.82 |

| | Wear Resistance | | | Surface initiated spalling life | | | | |
|---|---|---|---|---|---|---|---|---|
| | Average | | | | | | | |
| Test No. | Surface Hardness (HRC) | Wear Depth (μm) | Evaluation | Surface C (%) | Surface Hardness (HRC) | L10 (×10$^5$ cycles) | Evaluation | Overall Evaluation |
| 1 | 60 | 8 | E | 0.82 | 60 | 20.0 | E | E |
| 2 | 59 | 9 | E | 0.81 | 59 | 13.0 | E | E |
| 3 | 60 | 8 | E | 0.80 | 59 | 38.0 | E | E |
| 4 | 60 | 7 | E | 0.80 | 60 | 55.0 | E | E |
| 5 | 59 | 8 | E | 0.81 | 60 | 30.0 | E | E |
| 6 | 59 | 9 | E | 0.82 | 61 | 15.0 | E | E |
| 7 | 61 | 10 | E | 0.80 | 59 | 24.0 | E | E |
| 8 | 60 | 8 | E | 0.80 | 60 | 28.0 | E | E |
| 9 | 60 | 9 | E | 0.81 | 60 | 51.0 | E | E |
| 10 | 60 | 8 | E | 0.81 | 61 | 36.0 | E | E |
| 11 | 59 | 7 | E | 0.82 | 61 | 20.0 | E | E |
| 12 | 61 | 8 | E | 0.80 | 59 | 48.0 | E | E |
| 13 | 59 | 6 | E | 0.81 | 60 | 10.0 | E | E |
| 14 | 59 | 5 | E | 0.82 | 60 | 57.0 | E | E |
| 15 | 60 | 9 | E | 0.80 | 59 | 21.0 | E | E |
| 16 | 60 | 9 | E | 0.81 | 60 | 34.0 | E | E |
| 17 | 61 | 6 | E | 0.81 | 60 | 48.0 | E | E |
| 18 | 61 | 10 | E | 0.81 | 60 | 12.0 | E | NA |
| 19 | 60 | 8 | E | 0.80 | 60 | 6.3 | NA | NA |
| 20 | 60 | 9 | E | 0.82 | 61 | 30.0 | E | NA |
| 21 | 60 | 7 | E | 0.82 | 61 | 26.0 | E | NA |
| 22 | 59 | 13 | NA | 0.80 | 59 | 18.0 | E | NA |
| 23 | 60 | 8 | E | 0.81 | 59 | 20.0 | E | NA |
| 24 | 61 | 8 | E | 0.80 | 60 | 6.6 | NA | NA |
| 25 | 60 | 7 | E | 0.80 | 60 | 40.0 | E | NA |
| 26 | 59 | 22 | NA | 0.81 | 61 | 8.0 | E | NA |
| 27 | 59 | 8 | E | 0.82 | 61 | 6.9 | NA | NA |
| 28 | 60 | 18 | NA | 0.82 | 61 | 12.0 | E | NA |
| 29 | 60 | 8 | E | 0.80 | 59 | 6.4 | NA | NA |
| 30 | 61 | 13 | NA | 0.81 | 60 | 9.3 | E | NA |
| 31 | 61 | 7 | E | 0.81 | 60 | 6.5 | NA | NA |
| 32 | 60 | 20 | NA | 0.80 | 59 | 23.0 | E | NA |
| 33 | 59 | 10 | E | 0.80 | 60 | 31.0 | E | NA |
| 34 | 60 | 7 | E | 0.81 | 61 | 6.0 | NA | NA |
| 35 | 60 | 7 | E | 0.80 | 60 | 6.7 | NA | NA |
| 36 | 61 | 8 | E | 0.81 | 61 | 5.8 | NA | NA |
| 37 | 60 | 7 | E | 0.81 | 60 | 6.8 | NA | NA |
| 38 | 60 | 7 | E | 0.80 | 60 | 6.5 | NA | NA |
| 39 | 60 | 5 | E | 0.82 | 60 | 6.9 | NA | NA |

The produced cast pieces were heated and bloomed and thereafter subjected to continuous rolling to produce billets with dimensions of 160 mm×160 mm. The heating temperature of the cast pieces at such time was in the range of 1000° C. to 1300° C. In addition, after the produced billets were heated again, hot rolling was performed to produce steel bars with a diameter of 60 mm. The heating temperature of the billets at such time was in the range of 1000° C. to 1300° C.

One part of the steel bar with a diameter of 60 mm of each test number was cut off. To simulate a process for producing a carburized bearing part, each steel bar cut off was subjected to hot forging to produce a steel bar with a diameter of 30 mm. A normalizing treatment was performed in the steel bar with a diameter of 30 mm. Specifically, the steel bar with a diameter of 30 mm was held for one hour at 870° C., and thereafter was air-cooled.

A spheroidizing annealing treatment was performed on the steel bars with a diameter of 60 mm and the steel bars with a diameter of 30 mm. In the spheroidizing annealing, the steel bars with a diameter of 60 mm and the steel bars with a diameter of 30 mm were held for four hours at 760° C., and thereafter cooled to 600° C. at a rate of 15° C./hour, and thereafter were air-cooled.

The following hardenability evaluation test, inclusions evaluation test and toughness evaluation test were performed using the steel bars (diameter of 60 mm and diameter of 30 mm) after the spheroidizing annealing treatment, and the hardenability, inclusions and toughness were evaluated. In addition, the wear resistance and surface initiated spalling life of a carburized bearing part obtained by performing a carburizing treatment of each of the steel materials were evaluated.

[Hardenability Evaluation Test]

A hardenability evaluation test was performed by the following method. A Jominy test specimen with a flange, which had a diameter of 25 mm and a length of 100 mm was fabricated by machining from each steel bar with a diameter of 30 mm. Test specimens of each test number were subjected to the Jominy test conforming to JIS G 0561 (2011). After testing, a hardness $J_{11}$ at a position 11 mm from the water cooling end in the longitudinal direction of the test specimen was measured. The hardenability was evaluated based on the measured hardness $J_{11}$. It is desirable for a steel material for a carburized bearing part that is to be applied to a large-sized carburized bearing part to have a hardness $J_{11}$ that is not less than a Rockwell hardness HRC of 32. Therefore, it was determined that the hardenability was high ("E" in Table 2) when $J_{11}$ was not less than a Rockwell hardness HRC of 32. In contrast, when $J_{11}$ was less than a Rockwell hardness HRC of 32, it was determined that the hardenability was low ("NA" in Table 2).

[Inclusions Evaluation Test]

An inclusions evaluation test was performed by the following method. A cubic test specimen with 10 mm sides was fabricated by machining from each steel bar with a diameter of 30 mm in a manner in which the cubic test specimen was centered on one point on the central axis of the steel bar. A 10 mm×10 mm surface parallel to the longitudinal direction (rolling direction) of the steel bar was adopted as the suspected area. After embedding the test specimen in resin, the suspected area was mirror polished.

Sulfides within the suspected area after mirror polishing were identified by SEM (scanning electron microscopy). Specifically, arbitrary observation regions were selected at 100 locations inside the suspected area at a magnitude of ×500. The gross area of the observation regions (that is, the gross area of the observation regions at 100 locations) was 4 mm². In each observation region, sulfides were identified based on the contrast of a backscattered electron image observed with SEM. With regard to the numerical value range of brightness (multiple levels of gradation) that indicates a sulfide, the numerical value range was determined in advance by means of SEM and an EDS (Energy Dispersive X-ray micro analyzer), and as mentioned above, the numerical value range determined in advance as brightness indicating a sulfide was adopted as a reference range. Regions (sulfide regions) with a brightness in the reference range were determined from the observation regions by the method described above. The equivalent circular diameter of each sulfide region that was identified was calculated by the aforementioned method. When calculating the equivalent circular diameter of the sulfide regions, the area of oxides present within the respective sulfide regions was excluded from the calculation of the equivalent circular diameter. The gross area (μm²) of sulfide regions in which the calculated equivalent circular diameter was 1 or more with respect to the 100 observation regions (gross area 4 mm²) was defined as A2.

Next, the gross area A1 of sulfides containing Ca in an amount of 1 mol % or more and also having an equivalent circular diameter of 1 μm or more was determined by the following method. Each sulfide region having an equivalent circular diameter of 1 μm or more in the aforementioned observation regions (gross area 4 mm²) at 100 locations was subjected to quantitative analysis by EDS. Among the respective sulfide regions that were subjected to quantitative analysis, regions of sulfides containing Ca in an amount of 1 mol % or more were identified. For the EDS quantitative analysis of Ca in the sulfides, a semi-quantitative analysis method was used by utilizing the method described above. By means of the aforementioned semi-quantitative measurement method, the content of Ca in each sulfide region having an equivalent circular diameter of 1 μm or more was identified. Further, the gross area (μm²) of sulfide regions having an equivalent circular diameter of 1 μm or more and containing Ca in an amount of 1 mol % or more was determined, and the determined gross area was defined as A1. Note that, in the case of calculating A1 also, the areas of oxides present within the sulfide regions were excluded from the calculation. The thus determined A1 and A2 were used to determine Fn2 (=A1/A2) for each test number.

[Toughness Evaluation Test]

Figure 4:
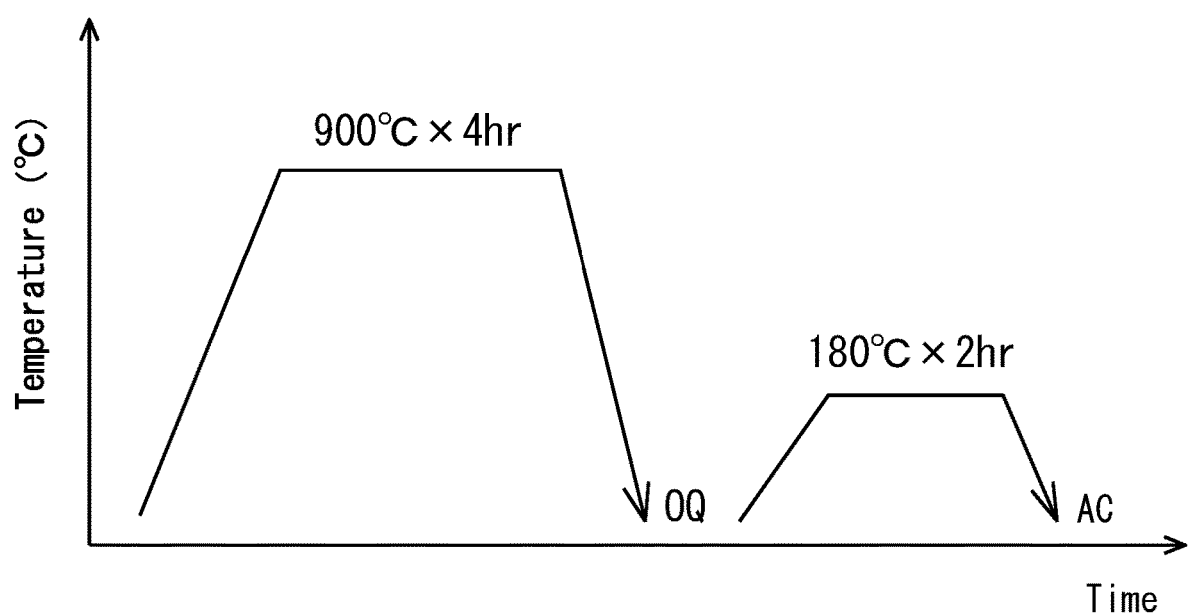
FIG. 4 is a view illustrating a heat pattern for describing an example of thermal refining conditions.

A toughness evaluation test was performed by the following method. Thermal refining (quenching and tempering) according to the heat pattern illustrated in FIG. 4 was performed on the steel bars with a diameter of 30 mm. Referring to FIG. 4, specifically, the steel bar with a diameter of 30 mm was held for four hours at 900° C., and thereafter oil quenching was performed ("OQ" in FIG. 4). After oil quenching, the steel bar was further subjected to tempering in which the steel bar was held at 180° C. for two hours, and thereafter was air-cooled ("AC" in FIG. 4).

A Charpy test specimen having a V notch was fabricated from the steel bar which had been subjected to the aforementioned thermal refining. The longitudinal direction of the Charpy test specimen was the same direction as the longitudinal direction of the steel bar. A Charpy impact test in accordance with JIS Z 2242 (2009) was conducted at room temperature on the Charpy test specimen of each test number. Absorbed energy obtained by the test was divided by an original sectional area of the notched part (sectional area of the notched part of the test specimen before testing) to determine an impact value $vE_{20}$ (J/cm²).

It is desirable for the impact value $vE_{20}$ of a steel material that is to be applied to a large-sized carburized bearing part to be 15.0 J/cm² or more. Therefore, it was determined that the toughness was high when the impact value $vE_{20}$ was 15.0 J/cm² or more ("E" in Table 2). In contrast, when the impact value $vE_{20}$ was less than 15.0 J/cm², it was determined that the toughness was low ("NA" in Table 2).

[Wear Resistance Evaluation Test]

Figure 5:
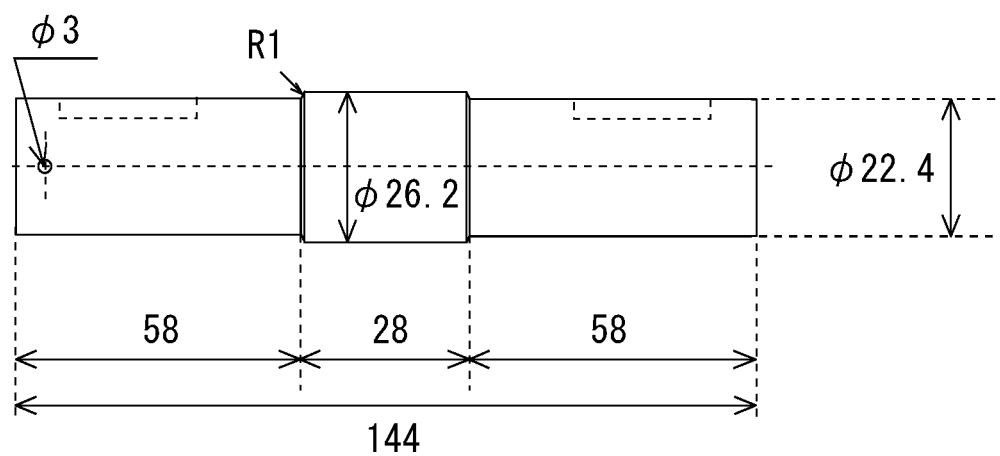
FIG. 5 is a side view of an intermediate product of a small roller test specimen that was used in a wear resistance evaluation test.

A wear resistance evaluation test was performed by the following method. An intermediate product illustrated in FIG. 5 was fabricated by machining from the steel bars with a diameter of 30 mm. FIG. 5 is a side view of the intermediate product. The numerical values in FIG. 5 show the dimensions (mm) of each site of the intermediate product. A numerical value beside "φ" in FIG. 5 shows a diameter (mm).

Figure 6:
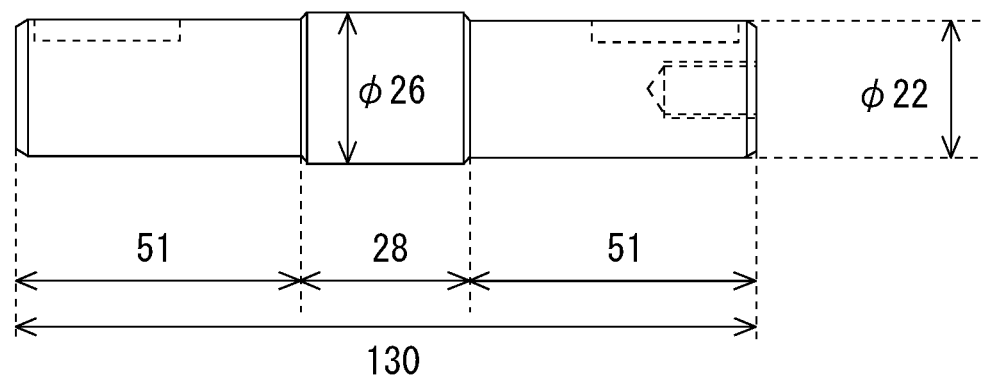
FIG. 6 is a side view of a small roller test specimen that was used in a wear resistance evaluation test.

After performing a carburizing treatment (in the present example, carburizing-quenching and tempering) on the intermediate product, finishing was performed to thereby produce a test specimen (small roller test specimen) having the shape illustrated in FIG. 6 which imitated a carburized bearing part. FIG. 6 is a side view of the test specimen. The numerical values in FIG. 6 show the dimensions (mm) of each site of the test specimen. A numerical value beside "φ" in FIG. 6 shows a diameter (mm). At such time, the conditions of the aforementioned carburizing treatment were adjusted so that the surface C concentration of the test specimen was 0.8%, and the surface hardness was a Rockwell hardness HRC of 62.

Figure 7:
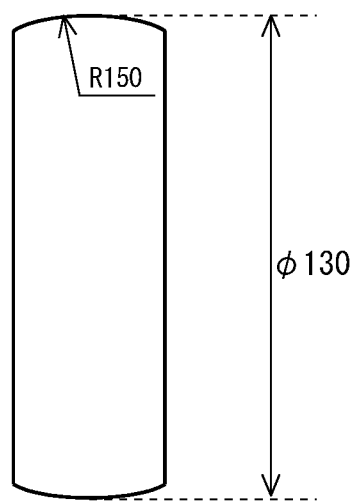
FIG. 7 is a front view of a large roller that was used in a wear resistance evaluation test.

As the wear resistance evaluation test, a roller pitting test (two-cylinder rolling fatigue test) was performed on the small roller test specimen of each test number. Specifically, as illustrated in FIG. 7, a large roller having a diameter of 130 mm and a crowning radius of 150 mm was prepared. The large roller had a chemical composition satisfying the specifications of SCM420 according to the JIS Standard, and was fabricated by common production processes, that is, by processes of normalizing, test specimen machining, carburizing treatment by means of a gas carburizing furnace, and polishing. The small roller test specimen and the large roller were arranged so that the central axis of the small roller test specimen and the central axis of the large roller were parallel. The roller pitting test was then performed under the following conditions. The surface of the large roller was pushed against a central portion (portion with a diameter of 26 mm) of the small roller test specimen. The speed of rotation of the small roller test specimen was set to 1500 rpm, the respective rotation directions of the small roller test specimen and the large roller at a contact portion were made the same direction, and the slip factor was −40%. When the rotational speed of the large roller was taken as V1 (m/sec), and the rotational speed of the small roller test specimen was taken as V2 (m/sec), the slip factor (%) was determined by the following equation.

$$\text{Slip factor}=(V2-V1)/V2\times100$$

The contact stress between the small roller test specimen and the large roller during the test was made 3000 MPa. During the test, a lubricant (a commercially available automatic transmission oil: ATF) was sprayed at the contact portion (surface of test portion) between the large roller and the small roller test specimen under a condition of an oil temperature of 80° C. at a rate of 2 L/min from a direction opposite to the rotation direction. The number of repetitions was set as up to $2\times10^7$ times, and the test was ended after the number of repetitions reached $2\times10^7$ times.

The average wear depth (μm), surface hardness (HRC) and surface C concentration (mass %) were determined by the following methods using the small roller test specimen after the wear resistance evaluation test.

[Average Wear Depth]

The roughness of a sliding portion of the test specimen after the test was measured. Specifically, a roughness profile was measured at four locations at a 90° pitch in the circumferential direction on the peripheral surface of the small roller test specimen. A maximum wear depth of the measured roughness profile at each measurement location was defined as the wear depth at each measurement location. The average value of the wear depths at the aforementioned four locations was defined as the average wear depth (μm).

When the average wear depth was 10 μm or less, the wear resistance was determined as being excellent ("E" in Table 2). On the other hand, when the average wear depth was more than 10 μm, the wear resistance was determined as being low ("NA" in Table 2).

[Surface Hardness]

In a region (hereinafter, referred to as a "non-sliding portion") other than the sliding portion of the peripheral surface of the small roller test specimen after the test, measurement positions were identified at four locations at a 90° pitch in the circumferential direction. At each of the identified measurement positions, a Rockwell hardness test using the C scale was performed in conformity with JIS Z 2245 (2011). The average of the Rockwell hardness HRC at each measurement location was defined as the Rockwell hardness HRC at the surface.

[Surface C Concentration]

The non-sliding portion of the small roller test specimen after test was cut vertically with respect to the axial direction. A test specimen including a cutting face including the non-sliding portion was taken, and the cutting face was embedded and finished by polishing. Thereafter, an electron probe micro-analyzer (EPMA) was used to measure the C concentration at a 0.1 μm pitch from the surface of the non-sliding portion to a depth of 10 μm. The average value of the measured values was defined as a surface C concentration (mass %).

[Surface Initiated Spalling Life Evaluation Test in Usage Environment with Foreign Matter Contamination]

A surface initiated spalling life evaluation test was performed by the following method. A disc-shaped rough test specimen which had a diameter of 60 mm and a thickness of 5.5 mm was taken from the steel bar with a diameter of 60 mm. The thickness (5.5 mm) of the rough test specimen corresponded to the longitudinal direction of the steel bar.

The rough test specimen of each test number was subjected to carburizing treatment (in the present example, carburizing-quenching and tempering) to produce a test specimen which imitated a carburized bearing part. At such time, the carburizing treatment was performed under carburizing treatment conditions that were adjusted so that the surface C concentration of each test specimen became 0.80%, and the Rockwell hardness HRC of the surface became 60. The surface of each obtained test specimen was subjected to lapping to provide a rolling fatigue test specimen. The surface C concentration (mass %) and surface hardness HRC after carburizing treatment for each test number are shown in Table 2. The methods for measuring the surface C concentration and surface hardness were the same as the methods for measuring the surface C concentration and surface hardness in the wear resistance evaluation test.

The rolling fatigue test was performed by using a thrust-type rolling fatigue test machine. The maximum contact interfacial pressure at the time of test was 5.0 GPa, and the repetition rate was 1800 cpm (cycles per minute). The lubrication oil used at the time of test was mixed with gas atomized powder of high speed steel, which was classified into Vickers hardness of 750 (Hv) and a particle size of 100 to 180 μm, as foreign matter. The mixed amount of the gas atomized powder was 0.02% with respect to the lubricant oil. A thermally refined material of SUJ2 specified in JIS G 4805 (2008) was used as the steel ball that was used at the time of test.

Results of the rolling fatigue test were plotted on Weibull probability paper, and L10 life which indicates 10% failure probability was defined as "surface initiated spalling life". Under a severe usage environment (main test) in which there was contamination with foreign matter, it was determined that the surface initiated spalling life was excellent ("E" in Table 2) if the L10 life was $7.0 \times 10^5$ or more. On the other hand, if the L10 life was less than $7.0 \times 10^5$, it was determined that the surface initiated spalling life was short ("NA" in Table 2).

[Test Results]

The test results are shown in Table 2. Referring to Table 2, the chemical compositions of the steel material for a carburized bearing part of Test Nos. 1 to 17 were appropriate, and satisfied Formula (1) and Formula (3). In addition, the holding time τ (min) of the molten steel temperature within the range of the liquidus temperature +50° C. to the liquidus temperature +100° C. in the tundish during continuous casting was appropriate, and satisfied Formula (2). Therefore, the steel materials for a carburized bearing part of these test numbers were excellent in hardenability. In addition, a carburizing treatment was performed on the steel materials of these test numbers, and the test specimens that imitated a carburized bearing part were excellent in wear resistance, surface initiated spalling life and toughness.

On the other hand, in Test No. 18, the content of P was too high. Therefore, the impact value $vE_{20}$ was less than 15.0 J/cm² and the toughness was low.

In Test No. 19, the content of S was too high. The impact value $vE_{20}$ was less than 15.0 J/cm² and the toughness was low. In addition, the L10 life was less than $7.0 \times 10^5$ and the surface initiated spalling life was also short.

In Test No. 20, the content of C was too low. Therefore, the hardness $J_{11}$ was less than a Rockwell hardness HRC of 32 and the hardenability was low.

In Test No. 21, the content of C was too high. Therefore, the impact value $vE_{20}$ was less than 15.0 J/cm² and the toughness was low.

In Test No. 22, the content of Si was too low. Therefore, the average wear depth was more than 10 μm and the wear resistance was low.

In Test No. 23, the content of Si was too high. Therefore, the impact value $vE_{20}$ was less than 15.0 J/cm² and the toughness was low.

In Test No. 24, the content of Mn was too low. Therefore, the L10 life was less than $7.0 \times 10^5$ and the surface initiated spalling life was short.

In Test No. 25, the content of Mn was too high. Therefore, the impact value $vE_{20}$ was less than 15.0 J/cm² and the toughness was low.

In Test No. 26, the content of Cr was too low. Therefore, the average wear depth was more than 10 μm and the wear resistance was low.

In Test No. 27, the content of Cr was too high. Therefore, the impact value $vE_{20}$ was less than 15.0 J/cm² and the toughness was low. In addition, the L10 life was less than $7.0 \times 10^5$ and the surface initiated spalling life was short.

In Test No. 28, the content of Mo was too low. Therefore, the average wear depth was more than 10 μm and the wear resistance was low.

In Test No. 29, the content of Mo was too high. Therefore, the L10 life was less than $7.0 \times 10^5$ and the surface initiated spalling life was short.

In Test No. 30, the content of V was too low. Therefore, the average wear depth was more than 10 μm and the wear resistance was low.

In Test No. 31, the content of V was too high. Therefore, the impact value $vE_{20}$ was less than 15.0 J/cm² and the toughness was low. In addition, the L10 life was less than $7.0 \times 10^5$ and the surface initiated spalling life was short.

In Test No. 32, Fn1 was too low. Therefore, the average wear depth was more than 10 μm and the wear resistance was low.

In Test No. 33, Fn3 was too low. Therefore, the hardness $J_{11}$ was less than a Rockwell hardness HRC of 32 and the hardenability was low.

In Test No. 34, the content of Ca was too low. Therefore, Fn2 was low. Consequently, the L10 life was less than $7.0 \times 10^5$ and the surface initiated spalling life was short.

In Test No. 35, the content of Ca was too high. Therefore, the L10 life was less than $7.0 \times 10^5$ and the surface initiated spalling life was short.

In Test No. 36, the content of Ca was too low. Therefore, Fn2 was low. Consequently, the L10 life was less than $7.0 \times 10^5$ and the surface initiated spalling life was short.

In Test No. 37, the content of S was too high. Therefore, the L10 life was less than $7.0 \times 10^5$ and the surface initiated spalling life was short.

In Test No. 38, although the chemical composition satisfied Formula (1) and Formula (3), the holding time τ (min) of the molten steel temperature within the range of liquidus temperature +50° C. to the liquidus temperature +100° C. in the tundish during continuous casting was too short. Therefore, Fn2 did not satisfy Formula (2). Consequently, the L10 life was less than $7.0 \times 10^5$ and the surface initiated spalling life was short.

In Test No. 39, although the chemical composition satisfied Formula (1) and Formula (3), the holding time τ (min) of the molten steel temperature within the range of liquidus temperature +50° C. to the liquidus temperature +100° C. in the tundish during continuous casting was too long. Therefore, Fn2 did not satisfy Formula (2). Consequently, the L10 life was less than $7.0 \times 10^5$ and the surface initiated spalling life was short.

An embodiment of the present invention has been described above. However, the foregoing embodiment is merely an example for implementing the present invention. Accordingly, the present invention is not limited to the above embodiment, and the above embodiment can be appropriately modified and implemented within a range which does not deviate from the gist of the present invention.

The invention claimed is:

1. A steel material for a carburized bearing part, having a chemical composition consisting of, by mass %, C: 0.25 to 0.45%,
Si: 0.15 to 0.45%,
Mn: 0.40 to 1.50%,
P: 0.015% or less,
S: 0.005% or less,
Cr: 0.60 to 2.00%,
Mo: 0.10 to 0.35%, V: 0.20 to 0.40%,
Al: 0.005 to 0.100%,
Ca: 0.0002 to 0.0010%,
N: 0.0300% or less,
O: 0.0015% or less
Ni: 0 to 1.00%,
B: 0 to 0.0050%,
Nb: 0 to 0.100% and
Ti: 0 to 0.10%,
with the balance being Fe and impurities, and satisfying Formula (1) to Formula (3):

$$1.20 < 0.4Cr + 0.4Mo + 4.5V < 2.75 \quad (1)$$

$$A1/A2 > 0.50 \quad (2)$$

$$2.7C + 0.4Si + Mn + 0.45Ni + 0.8Cr + Mo + V > 2.55 \quad (3)$$

where, a content (mass %) of a corresponding element is substituted for each symbol of an element in Formula (1) and Formula (3); if a corresponding element is not contained, "0" is substituted for the symbol of the relevant element; in Formula (2), "A1" represents a gross area ($\mu m^2$) of sulfides containing Ca in an amount of 1 mol % or more and having an equivalent circular diameter of 1 μm or more in an observation region with a gross area of 4 $mm^2$ or more in a cross section that is parallel to a rolling direction; and "A2" represents a gross area ($\mu m^2$) of sulfides having an equivalent circular diameter of 1 μm or more in the observation region.

2. The steel material for a carburized bearing part according to claim 1,
wherein the chemical composition contains one or more types of element selected from a group consisting of:
Ni: 0.05 to 1.00%, and
B: 0.0003 to 0.0050%.

3. The steel material for a carburized bearing part according to claim 1,
wherein the chemical composition contains one or more types of element selected from a group consisting of:
Nb: 0.005 to 0.100%, and
Ti: 0.01 to 0.10%.

4. The steel material for a carburized bearing part according to claim 2,
wherein the chemical composition contains one or more types of element selected from a group consisting of:
Nb: 0.005 to 0.100%, and
Ti: 0.01 to 0.10%.

* * * * *